United States Patent
Narita et al.

(10) Patent No.: US 7,028,880 B2
(45) Date of Patent: Apr. 18, 2006

(54) FRICTION AGITATION JOINING METHOD, METHOD FOR MANUFACTURING JOINED BUTTED MEMBERS AND FRICTION AGITATION JOINING APPARATUS

(75) Inventors: Masayuki Narita, Saitama-ken (JP); Yasuyuki Hama, Saitama-ken (JP); Hiroshi Akiyama, Saitama-ken (JP); Takenori Hashimoto, Tokyo (JP); Shigetoshi Jogan, Tokyo (JP); Yoshitaka Nagano, Tokyo (JP)

(73) Assignees: Honda Giken Kogyo Kabushiki Kaisha, Tokyo (JP); Showa Denko K.K., Tokyo (JP)

( * ) Notice: Subject to any disclaimer, the term of this patent is extended or adjusted under 35 U.S.C. 154(b) by 0 days.

(21) Appl. No.: 10/471,016

(22) PCT Filed: Mar. 7, 2002

(86) PCT No.: PCT/JP02/02157

§ 371 (c)(1),
(2), (4) Date: Mar. 8, 2004

(87) PCT Pub. No.: WO02/070187

PCT Pub. Date: Sep. 12, 2002

(65) Prior Publication Data

US 2004/0134971 A1    Jul. 15, 2004

Related U.S. Application Data

(60) Provisional application No. 60/303,158, filed on Jul. 6, 2001, provisional application No. 60/303,146, filed on Jul. 6, 2001.

(30) Foreign Application Priority Data

Mar. 7, 2001    (JP) ............................... 2001-63267
Mar. 7, 2001    (JP) ............................... 2001-63293

(51) Int. Cl.
*B23K 20/12* (2006.01)

(52) U.S. Cl. .................................................. 228/112.1

(58) Field of Classification Search ............. 228/112.1, 228/2.1; 428/544, 615; 148/621, 333, 417, 148/694, 405
See application file for complete search history.

(56) References Cited

U.S. PATENT DOCUMENTS

| | | | |
|---|---|---|---|
| 5,769,306 A | * | 6/1998 | Colligan .................. 228/112.1 |
| 6,070,784 A | | 6/2000 | Holt et al. |
| 6,367,681 B1 | * | 4/2002 | Waldron et al. ......... 228/112.1 |
| 6,780,525 B1 | * | 8/2004 | Litwinski .................... 428/615 |

FOREIGN PATENT DOCUMENTS

| | | |
|---|---|---|
| JP | 10-225781 | 8/1998 |
| JP | 11-28582 | 2/1999 |
| JP | 11-320127 | 11/1999 |
| JP | 2000-167676 | 6/2000 |

OTHER PUBLICATIONS

Stephan Kallee et al.: "Friction stir welding in the automotive body in white production" 1st International Symposium on Friction Stir Welding Jun. 14, 1999.

Christopher B. Smith: "Robotic friction stir welding using a standard industrial robot" 2nd International Symposium on Friction Stir Welding Jun. 26, 2000.

* cited by examiner

*Primary Examiner*—Jonathan Johnson
(74) *Attorney, Agent, or Firm*—Oblon, Spivak, McClelland, Maier & Neustadt, P.C.

(57) ABSTRACT

In a friction agitation joining method, two plate-shaped joining members different in thickness, or first and second joining members, are abutted against each other with a level difference formed at upper surface sides thereof. A rotating probe of a joining tool is inserted into the butted portion of the first and second joining members from upper surface sides thereof. Joining-direction front sides of the first and second joining members with respect to the probe inserted position are pressed by first and second front pressing rollers, respectively, from the upper surface sides thereof. Furthermore, joining-direction lower sides of the first and the second joining members with respect to a probe inserted position from the upper surface sides are pressed by first and second lower pressing rollers, respectively, from the upper surface sides thereof. In this state, the butted portion is joined by the friction agitation joining method.

5 Claims, 27 Drawing Sheets

FRICTION AGITATION JOINING METHOD, METHOD FOR MANUFACTURING JOINED BUTTED MEMBERS AND FRICTION AGITATION JOINING APPARATUS

CROSS REFERENCE TO RELATED APPLICATIONS

This application claims priority to Japanese Patent Applications Nos. 2001-63267 and 2001-63293 each filed on Mar. 7, 2001, and U.S. Provisional Applications Nos. 60/303,146 and 60/303,158 each filed on Jul. 6, 2001 the disclosure of which is incorporated by reference in its entirety.

This application is an application filed under 35 U.S.C. §111(a) claiming the benefit pursuant to 35 U.S.C. §119(e)(1) of the filing data of Provisional Applications Nos. 60/303,146 and 60/303,158 each filed on Jul. 6, 2001 pursuant to 35 U.S.C. §111(b).

TECHNICAL FIELD

The present invention relates to a friction agitation joining method, a method for manufacturing joined butted members and a friction agitation joining apparatus preferably used for manufacturing metal plate-shaped members used as, for example, flooring materials, wall materials and ceiling materials for transporting device such as automobiles, aircrafts and railroad vehicles.

BACKGROUND ART

A friction agitation joining method belongs to a category of a solid state welding method. The friction agitation joining method has such advantages that it can be applied to various metal joining members regardless of the materials and that joining members are hardly deformed by thermal strains at the time of joining. Thus, in recent years, the method has been used for joining various structural members.

This friction agitation joining method will be explained with reference to FIGS. 29 to 31. In these figures, the reference numeral 101 denotes a long and thin plate-shaped metal first joining member, and 102 denotes a long and thick plate-shaped metal second joining member. These joining members 101 and 102 are butted against each other at the widthwise sides thereof with the lower surfaces being flush with each other (the reference numeral 103 denotes the butted portion). Thus, the level difference corresponding to the thickness difference is formed at the surface side thereof. In this butted state, these joining members 101 and 102 are supported from the lower surface sides thereof by the forward and backward supporting rollers 131 and 132. The reference numeral 104 denotes a stepped portion formed at the surface side of the joining members 101 and 102.

The reference numeral 140 denotes a joining tool for performing a friction agitation joining method. This joining tool 140 is equipped with a columnar rotor 141 having a larger diameter and a pin-shaped probe 142 having a smaller diameter integrally protruded from the rotational center of the end surface of the rotor 141 and extending along the rotation axis Q'.

The reference numeral 133 denotes a backing roller. This backing roller 133 is disposed at the lower surface side of the joining members 101 and 102 opposite to the probe 142 of the joining tool 140.

When joining the butted portion 103 of the joining members 101 and 102 using the friction agitation joining tool 140, first, the rotating probe 142 of the joining tool 140 is inserted into the butted portion 103 of the joining members 101 and 102 from the upper side thereof. Then, in this inserted state, both the joining members 101 and 102 are moved in a longitudinal direction thereof with the probe inserted in the butted portion 103 so that the probe 142 advances along the butted portion 103. "MD'" denotes the moving direction of both the joining members 101 and 102. In accordance with the movement of both the joining members 101 and 102, the butted portion 103 of both the joining members 101 and 102 is joined by the probe 142 at the probe inserted position. The reference numeral 103' denotes a joined (i.e., welded) butted portion of the joining members 101 and 102. "W'" denotes a joined portion formed at the butted portion 103'. Furthermore, "WD'" shows the joining direction in this friction agitation joining method.

In cases where the joining members 101 and 102 are twisted or curved in the thickness direction, i.e., not formed into a flat shape, joining of such joining members 101 and 102 causes a defect of shape. As a result, high quality joined butted members cannot be obtained. Furthermore, if these joining members 101 and 102 are butted against each other in the state that they have torsion, clearance (not shown) resulting from the torsion of the joining members 101 and 102 will be generated at the butted portion 103. Accordingly, if the butted portion 103 is joined in this state, a joining defect such as a non-joined portion will occur in the joined portion 103' by the clearance. Furthermore, in cases where the joining members are long or thin members, even if these members are joined by friction agitation joining, thermal distortion due to the joining tends to be produced.

In order to solve this problem, Japanese Unexamined Laid-open Patent Publication No. H10-296462 proposes the following method. In this method, a butted portion will be joined/welded while pressing the joining-direction forward side of both the joining members 101 and 102 with respect to a probe inserted position from the upper surface side thereof by a cylindrical forward pressing roller 110 having a certain length and bridging over both the joining members 101 and 102, and also pressing the joining-direction backward side of both the joining members 101 and 102 with respect to a probe inserted position from the upper surface side thereof by a cylindrical backward pressing roller 110 having a certain length and bridging over both the joining members 101 and 102.

However, since the stepped portion 104 is formed on the surface of the butted portion 103 of the joining members 101 and 102, according to the aforementioned proposed method, even if the forward and backward pressing rollers 110 and 120 are intended to press both the joining members 101 and 102, it was able to press down the thicker joining member 102 with the forward and backward pressing rollers 110 and 120, but was not able to press down the thinner joining member 101. As a result, neither torsion nor curvature could be corrected. Therefore, the joining members 101 and 102 are joined in a state that they have torsion or curvature, and therefore configuration defects, joining defects such as a non-joined state and thermal distortion occur. Accordingly, high quality joined butted members cannot be obtained.

Now, generally, in a friction agitation joining method, it is desirable to execute the joining method in a state in which the probe 142 of the joining tool 140 is deeply inserted into the butted portion 103 so as to join the butted portion 103 in the entire thickness direction thereof.

However, if the friction agitation joining is performed in a state in which the probe 142 is inserted as mentioned above, the tip of the probe 142 may project from the lower surface of the butted portion 103 of the joining members 101 and 102 during the joining process, which in turn may cause a damage to the backing member such as a backing roller 133. In order to prevent such a fault, as shown in FIG. 30, generally the probe 142 is inserted so as to keep the distance between the tip of the probe 142 and the lower surface of the butted portion 103. However, this insufficient insertion of the probe 142 causes insufficient joining of the butted portion 103 with respect to the thickness direction. As a result, as shown in FIG. 31, the root remaining portion R tends to remain in the lower surface of the joined butted portion 103' where both the joining members 101 and 102 are joined. This root remaining portion R causes reduced bonding strength of the butted joining members.

As shown in FIGS. 30 and 31, especially in cases where both the joining members 101 and 102 are butted against each other with a level difference formed on the surface side in the thickness direction, the root remaining portion R tends to remain. That is, in cases where both the joining members 101 and 102 are butted against each other as mentioned above, it is difficult to stably dispose the end surface 141a of the rotor 141 of the joining tool 140 on both the joining members 101 and 102, and therefore as shown in FIG. 30, the rotor 141 tends to incline to the first joining member side 101 or the second joining member side 102 unexpectedly. Thus, at the time of inclination of the rotor 141, since the insertion depth of the probe 142 in the butted portion 103 changes, it is necessary to reduce the insertion depth of the probe 142 for safety, which in turn tends to generate the root remaining portion R.

Furthermore, as shown in FIG. 30, in this case, since the rotor 141 of the joining tool 140 is usually disposed in a inclined state toward the first joining member side 101, it is difficult to strictly set the insertion depth of the probe 142 into the butted portion 103. Furthermore, since the insertion depth of the probe 142 increases because the shoulder portion 102a of the second joining member 102 deforms plastically during the joining, it is necessary to decrease the insertion depth of the probe 142. For this reason, the root remaining portion R tends to remain.

Furthermore, since the thickness of manufactured joining member 101 and 102 is uneven, it is difficult to keep the constant insertion depth of the probe 142. From this point too, the root remaining portion R tends to remain.

The present invention was made in view of the aforementioned technical background.

It is a first object of the present invention to provide a friction agitation joining method, a method for manufacturing joined butted members and a friction agitation joining apparatus capable of preventing a generation of configuration defects such as twist or curvature and a generation of poor junction such as joint defect or thermal distortion, to thereby provide high quality joined butted members.

It is a second object of the present invention to provide a friction agitation joining method, a method for manufacturing joined butted members and a friction agitation joining apparatus capable of preventing a generation of a root remaining portion to thereby provide high quality joined butted members.

Other objects and advantages of the present invention will be apparent from the following preferred embodiments.

DISCLOSURE OF INVENTION

In order to attain the aforementioned first object of the present invention, according to the first aspect of the present invention, in a friction agitation joining method for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, joining of the butted portion is performed while pressing joining-direction forward sides of the first joining member and the second joining member with respect to a probe inserted position from the upper surface sides by a first forward pressing roller and a second forward pressing roller, respectively.

According to the first aspect of the present invention, by pressing joining-direction forward sides of the first joining member and the second joining member with respect to a probe inserted position from the upper surface sides by a first forward pressing roller and a second forward pressing roller, respectively, it is possible to prevent a fault such as an unexpected movement of each joining member during the joining and also to correct the configuration defect of each joining member such as torsion or curvature. Furthermore, performing the joining process in this state can prevent the generation of poor junction such as joint defect or thermal distortion, resulting in high quality butted joining members.

In order to attain the aforementioned first object of the present invention, according to the second aspect of the present invention, in a friction agitation joining method for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, joining of the butted portion is performed while pressing joining-direction backward sides of the first joining member and the second joining member with respect to a probe inserted position from the upper surface sides by a first backward pressing roller and a second backward pressing roller, respectively.

According to the second aspect of the present invention, by pressing joining-direction backward sides of the first joining member and the second joining member with respect to a probe inserted position from the upper surface sides by a first backward pressing roller and a second backward pressing roller, respectively, it is possible to prevent a fault such as an unexpected movement of each joining member during the joining and also to correct the configuration defect of each joining member such as torsion or curvature. Furthermore, performing the joining process in this state can prevent the generation of poor junction such as joint defect or thermal distortion, resulting in high quality joined butted members.

In order to attain the aforementioned first object of the present invention, according to the third aspect of the present invention, in friction agitation joining method for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, joining of the butted portion is performed while pressing joining-direction forward sides of the first joining member and the second joining member with respect to a probe inserted position from the upper surface sides by a first forward pressing roller and a second forward pressing roller, respectively, and pressing joining-direction backward sides of the first joining member and the second joining member with respect to a probe inserted position from the upper surface sides by a first backward pressing roller and a second backward pressing roller, respectively.

According to the third aspect of the present invention, joining-direction forward sides of the first joining member and the second joining member with respect to a probe inserted position is pressed from the upper surface sides by a first forward pressing roller and a second forward pressing roller, respectively. Furthermore, joining-direction backward sides of the first joining member and the second joining member with respect to a probe inserted position is pressed from the upper surface sides by a first backward pressing roller and a second backward pressing roller, respectively. Accordingly, it is possible to prevent a fault such as an unexpected movement of each joining member during the joining and also to correct the configuration defect of each joining member such as torsion or curvature. Furthermore, performing the joining process in this state can prevent the generation of poor junction such as joint defect or thermal distortion, resulting in high quality joined butted members.

In the first or third aspect of the present invention, a metal member, for example, may be used as a joining member. Furthermore, at the time of joining operation, both the joining members are usually supported by the support member from the lower surface side thereof. As this support member (means), various means including the support roller which will be mentioned later can be used.

In the aforementioned first or third aspect of the present invention, it is preferable that the joining of the butted portion is performed while pressing at least a portion near the butted portion at the joining-direction forward side of the first joining member with respect to a probe inserted position and at least a portion near the butted portion at the joining-direction forward side of the second joining member with respect to a probe inserted position from the upper surface sides by the first forward pressing roller and the second forward pressing roller, respectively.

In this case, each joining member can be pressed assuredly. As a result, the generation of poor junction such as joint defect or thermal distortion can be prevented more assuredly, resulting in high quality joined butted members.

In any one of the first to third aspects of the present invention, it is preferable that the joining of the butted portion is performed while pressing a joined butted portion of the first and second joining members from the upper surface sides by a third backward pressing roller with a tapered periphery.

In this case, by pressing the joined butted portion by the third backward pressing roller, the joined butted portion is pressed by the pressing force from the third backward pressing roller and thereby plastically deformed, so that the surface becomes into an inclined surface. Furthermore, due to this plastic deformation, the materials of the shoulder portion of the joining members will be filled in the corner of the stepped portion. Furthermore, minute unevenness, such as a burr which may sometimes be generated on the surface of the joined butted portion, is pressed and removed by receiving the press force from the third backward pressing roller. Accordingly, the surface of the joined butted portion is formed into an inclined surface and smoothed with the inclined state. When the surface of the joined butted portion is formed into such an inclined surface, the stress concentration produced in the stepped portion of the obtained butted joining members is relieved. Furthermore, when the joined butted portion is pressed as mentioned above, the tension residual stress produced on the surface of the joined butted portion is converted into a compression residual stress, which enhances the durability of the butted joining members. Furthermore, since the surface of the joined butted portion is smoothed, the generating of the film defects due to the aforementioned minute unevenness which may sometimes be generated at the time of painting can be prevented. As a result, it becomes possible to form a film on the surface of the joined butted portion appropriately.

It is preferable that the periphery of the third backward pressing roller is cooled. In this case, the upper surface of the joined butted portion of the joining members is forcibly cooled by being contacted by the cooled periphery of the roller. Thereby, the joined butted portion is quenched. Accordingly, the joining strength improves. Furthermore, the superfluous heat produced in the joined butted portion is removed, resulting in, a good joining state.

In any one of the aforementioned first to third aspects of the present invention, it is preferable that the joining of the butted portion is performed while cooling a lower surface of a joined butted portion of the first and second joining members by keeping a cooled periphery of a cooling roller in contact with the lower surface.

In this case, the lower surface of the joined butted portion of the joining members is forcibly cooled by being contacted by the cooled periphery of the roller. Thereby, the joined butted portion is quenched. Accordingly, the joining strength improves. Furthermore, the superfluous heat produced in the joined butted portion is removed, resulting in a good joining state.

In the first or third aspect of the present invention, it is preferable that the first forward pressing roller and the second forward pressing roller are separate members, and that the joining of the butted portion is performed in a state in which an axis of at least one of rollers including the first forward pressing roller and the second forward pressing roller is inclined with respect to a butting direction of the joining members within a plane perpendicular to a joining direction.

In this case, since the first forward pressing roller and the second forward pressing roller are separate members, even if the thick dimension of at least one of the joining members fluctuates in a direction parallel to the joining direction, the joining members can be pressed firmly. Furthermore, by inclining an axis of at least one of rollers including the first forward pressing roller and the second forward pressing roller with respect to the butting direction of the joining members within a plane perpendicular to the joining direction, the pressing force from the roller received by the joining member can be changed in the butting direction. Then, by joining the butted portion in this state, the generation of poor junction such as joint defect or thermal distortion can be prevented more assuredly.

In the first or third aspect of the present invention, it is preferable that the first forward pressing roller and the second forward pressing roller are separate members, and that the joining of the butted portion is performed while changing at least one of an inclination angle of an axis of the first forward pressing roller with respect to a butting direction of the first joining member within a plane perpendicular to a joining direction and an inclination angle of an axis of the second forward pressing roller with respect to the butting direction of the second joining member within a plane perpendicular to a joining direction based on a measured value of a characteristic concerning a joint state of a joined butted portion of the first and second joining members.

In this case, a poor junction prevention work can be performed efficiently. As a characteristic concerning the joint state of the joined butted portion, the surface temperature and its surface residual stress of the joined butted portion can be exemplified.

In the first or third aspect of the present invention, it is preferable that the first forward pressing roller and the second forward pressing roller are separate members, and that the joining of the butted portion is performed in a state in which an axis of at least one of rollers including the first forward pressing roller and the second forward pressing roller is inclined with respect to a butting direction of the joining members within a plane parallel to upper surfaces of the joining members so that force in a butting direction is given to the joining members.

In this case, since the first forward pressing roller and the second forward pressing roller are separate members, even if the thick dimension of at least one of the joining members fluctuates in a direction parallel to the joining direction, the joining members can be pressed firmly. Furthermore, by inclining the axis of at least one of rollers including the first forward pressing roller and the second forward pressing roller with respect to a butting direction of the joining members within a plane parallel to upper surfaces of the joining members so that force in a butting direction is given to the joining members, both the joining members come to stick strongly at the butted portion. Thus, by joining the butted portion in this state of this adhesion, the joining members can be joined firmly at the butted portion.

In any one of the aforementioned first to third aspects of the present invention, it is preferable that the joining of the butted portion is performed in a state in which the joining-direction forward sides of the first joining member and the second joining member with respect to a probe inserted position is supported from lower surface sides thereof by a first forward supporting roller and a second forward supporting roller separated from the first forward supporting roller, respectively, and an axis of at least one of rollers including the first forward supporting roller and the second forward supporting roller is inclined with respect to a butting direction of the joining members within a plane parallel to lower surfaces of the joining members so that force in a butting direction is given to the joining members.

In this case, both the joining members come to stick strongly at the butted portion. Thus, by joining the butted portion in this state of this adhesion, the joining members can be joined firmly at the butted portion.

In any one of the aforementioned first to third aspects of the present invention, it is preferable that the joining of the butted portion is performed in a state in which the joining-direction backward sides of the first joining member and the second joining member with respect to a probe inserted position is supported from lower surface sides thereof by a first backward supporting roller and a second backward supporting roller separated from the first backward supporting roller, respectively.

In this case, by using a backward supporting roller divided into the first backward supporting roller and the second backward supporting roller, the design freedom of the backward supporting roller increases. Accordingly, for example, by changing the mutual arrangement of the first backward supporting roller or the second backward supporting roller or changing the circumferential speed thereof, a meandering movement of the joining members which may be generated at the time of the movement of the joining members can be prevented, and the straightening effect to the configuration defect of each joining member can be expected.

In any one of the aforementioned first to third aspects of the present invention, it is preferable that the joining of the butted portion is performed in a state in which tension in a direction parallel to a joining direction is given to at least one of the first joining member and the second joining member.

In this case, configuration defects, such as curvature, twist and deflection, can be corrected, and surface vibration of each joining member can be suppressed. By joining the butted portion in this state, the quality of the butted joining members to be obtained can be improved.

In any one of the aforementioned first to third aspects of the present invention, it is preferable that the joining of the butted portion is performed while heating a lower surface of a probe inserted position of the butted portion or a lower surface of a joining-direction forward side of the probe inserted position.

In this case, heat conducts in the thickness direction from the lower surface of both the joining members, and the portion near the lower surface in the thickness direction becomes high in temperature. Accordingly, the materials between the tip of the probe and the lower surface of the joining members can be softened quickly at the time of joining, preventing the generation of the root remaining portion, which results in increased joining strength.

As a heating apparatus for heating the lower surface of both the joining members, a heating roller having a heated periphery to be contacted to the lower surface of the probe inserted position or the lower surface of the joining-direction forward side of the probe inserted position at the butted portion of the joining members, a laser irradiation heating apparatus, or a high frequency induction heating apparatus can be used suitably. Furthermore, in cases where at least one of the joining members is made of an aluminum or its alloy, it is especially preferable that the lower surface is heated such that the temperature of the lower surface falls within the range of from 400 to 500° C.

In any one of the aforementioned first to third aspects of the present invention, it is preferable that the joining of the butted portion is performed while relatively moving the first and second joining members with respect to a rotating sub-probe of a sub-joining tool inserted into the butted portion of the first and second joining members or a joined butted portion from a lower surface side thereof so that the probe and the sub-probe advance along the butted portion.

In this case, the butted portion is joined while the root remaining portion is joined by the sub-probe of the sub-joining tool. Accordingly, the generation of root remaining portion can be prevented (suppressed), and the joining strength can be improved.

It is preferable that the insertion depth of the sub-probe of the sub-joining tool into the butted portion or the joined butted portion from the lower surface thereof falls within the range of from 0.1 to 0.5 mm. The reasons are as follows. If the insertion depth is less than 0.1 mm, there is a possibility that the insertion depth may be insufficient and therefore the root remaining portion may remain. On the other hand, if the insertion depth exceeds 0.5 mm, the force required for moving both the joining members becomes large, and therefore it becomes difficult to move the joining members. Accordingly, it is preferable that the insertion depth falls within the range of from 0.1 to 0.5 mm. Furthermore, it is especially preferable that the insertion depth is set so as to fall within the aforementioned range in cases where the two joining members are different in wall thickness and the wall thickness of the thinner joining member is 3 mm or less. Furthermore, it is also especially preferable to set the insertion depth to the aforementioned range in cases where the wall thickness of two joining members is the same and 3 mm or less.

In order to attain the aforementioned second object, according to the fourth aspect of the present invention, in a friction agitation joining method for joining a first joining member and a second joining member butted against each other by relatively moving the first and second joining members with respect to a rotating probe of a joining tool inserted into a butted portion of the first and second joining members from upper surface sides thereof so that the probe advances along the butted portion, the joining of the butted portion is performed while heating a lower surface of a probe inserted position of the butted portion or a lower surface of a joining-direction forward side of the probe inserted position.

In the friction agitation joining method according to the fourth aspect of the present invention, heat conducts in the thickness direction from the lower surface of both the joining members, and the portion near the lower surface in the thickness direction becomes high in temperature. Accordingly, the materials between the tip of the probe and the lower surface of the joining members can be softened quickly at the time of joining, preventing the generation of the root remaining portion, which results in increased joining strength.

As a heating apparatus for heating the lower surface of both the joining members, the aforementioned heating roller, a laser irradiation heating apparatus, or a high frequency induction heating apparatus can be used suitably. Furthermore, in cases where at least one of the joining members is made of an aluminum or its alloy, it is especially preferable that the lower surface is heated such that the temperature of the lower surface falls within the range of from 400 to 500° C. Furthermore, in this fourth aspect of the present invention, the wall thickness of the two joining members may be the same or different with each other. Furthermore, the two joining members may be arranged such that the level difference is formed at the upper surface side of both the joining members. Alternatively, they may be arranged such that the level difference is not formed at the upper surface side thererof.

In the aforementioned fourth aspect of the present invention, it is preferable that the heating is performed by heat conduction from a heated periphery of a backing roller disposed opposite to the probe at a lower surface side of the joining members.

In this case, the heated periphery of the backing roller is contacted to the lower surface of the probe insertion position of the butted portion of the joining members at the time of joining. Thereby, the heat of the periphery of the backing roller conducts at the lower surfaces of the joining members, and therefore the lower surfaces are heated. Thus, the butted portion is joined while being heated. Accordingly, the joining operation can be performed efficiently. Furthermore, since the lower surface of the probe inserted position at the butted portion of the joining members is heated, the heat loss is small, and therefore the heating can be performed efficiently.

In order to attain the aforementioned second object, according to the fifth aspect of the present invention, in a friction agitation joining method for joining a first joining member and a second joining member butted against each other with upper and lower surfaces being flush with each other by relatively moving the first and second joining members with respect to a rotating probe of a joining tool inserted into a butted portion of the first and second joining members from upper surface sides thereof so that the probe advances along the butted portion, the joining of the butted portion is performed while relatively moving the first and second joining members with respect to a rotating sub-probe of a sub-joining tool inserted into the butted portion of the first and second joining members or a joined butted portion from a lower surface side thereof so that the probe and the sub-probe advance along the butted portion.

In this case, the butted portion is joined while the root remaining portion is joined by the sub-probe of the sub-joining tool. Accordingly, the generating of root remaining portion can be prevented (suppressed), and the joining strength can be improved.

In the aforementioned fifth aspect of the present invention, it is preferable that an insertion depth of the sub-probe is regulated within the range of from 0.1 to 0.5 mm. The reasons have been mentioned above. Furthermore, in cases where the thickness of the joining member is 3 mm or less, it is preferable that the insertion depth of the sub-probe is set so as to fall within the aforementioned range.

In order to attain the aforementioned first object, according to the sixth aspect of the present invention, in method for manufacturing joined butted members by performing a friction agitation joining method for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, joining of the butted portion is performed while pressing joining-direction forward sides of the first joining member and the second joining member with respect to a probe inserted position from the upper surface sides by a first forward pressing roller and a second forward pressing roller, respectively.

According to the method of the sixth aspect of the present invention, the same function as in the first aspect of the present invention can be obtained.

In order to attain the aforementioned first object, according to the seventh aspect of the present invention, in a method for manufacturing joined butted member by performing a friction agitation joining method for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, joining of the butted portion is performed while pressing joining-direction backward sides of the first joining member and the second joining member with respect to a probe inserted position from the upper surface sides by a first backward pressing roller and a second backward pressing roller, respectively.

According to the method of the seventh aspect of the present invention, the same function as in the second aspect of the present invention can be obtained.

In order to attain the aforementioned first object, according to the eighth aspect of the present invention, in a method for manufacturing joined butted members by performing a friction agitation joining method for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, joining of the butted portion is performed while pressing joining-direction forward sides of the first joining member and the second joining member with respect to a probe inserted position from the upper surface sides by a first forward pressing roller and a second forward pressing roller, respectively, and pressing joining-direction backward sides of the first joining member and the second joining member with respect to a probe inserted position from the upper surface sides by a first backward pressing roller and a second backward pressing roller, respectively.

According to the method of the eighth aspect of the present invention, the same function as in the third aspect of the present invention can be obtained.

In any one of the aforementioned sixth to eighth aspects of the present invention, it is preferable that the joining of the butted portion is performed while heating a lower surface of a probe inserted position of the butted portion or a lower surface of a joining-direction forward side of the probe inserted position.

In this case, the generating of the root remaining portion can be prevented, and the joining strength can be improved.

In any one of the aforementioned sixth to eighth aspects of the present invention, it is preferable that the joining of the butted portion is performed while relatively moving the first and second joining members with respect to a rotating sub-probe of a sub-joining tool inserted into the butted portion of the first and second joining members or a joined butted portion from a lower surface side thereof so that the probe and the sub-probe advance along the butted portion.

In this case, the generating of the root remaining portion can be prevented, and the joining strength can be improved.

In order to attain the aforementioned second object, according to the ninth aspect of the present invention, in a method for manufacturing joined butted members by performing a friction agitation joining method for joining a first joining member and a second joining member butted against each other by relatively moving the first and second joining members with respect to a rotating probe of a joining tool inserted into a butted portion of the first and second joining members from upper surface sides thereof so that the probe advances along the butted portion, the joining of the butted portion is performed while heating a lower surface of a probe inserted position of the butted portion or a lower surface of a joining-direction forward side of the probe inserted position.

In this case, the generating of the root remaining portion can be prevented, and the joining strength can be improved.

In order to attain the aforementioned second object, according to the tenth aspect of the present invention, in a method for manufacturing joined butted members by performing a friction agitation joining method for joining a first joining member and a second joining member butted against each other with upper and lower surfaces being flush with each other by relatively moving the first and second joining members with respect to a rotating probe of a joining tool inserted into a butted portion of the first and second joining members from upper surface sides thereof so that the probe advances along the butted portion, the joining of the butted portion is performed while relatively moving the first and second joining members with respect to a rotating sub-probe of a sub-joining tool inserted into the butted portion of the first and second joining members or a joined butted portion from a lower surface side thereof so that the probe and the sub-probe advance along the butted portion.

In this case, the generating of the root remaining portion can be prevented, and the joining strength can be improved.

In order to attain the aforementioned first object, according to the eleventh aspect of the present invention, a friction agitation joining apparatus for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, comprises: a first forward pressing roller for pressing joining-direction forward side of the first joining member with respect to a probe inserted position from upper surface side thereof; and a second forward pressing roller for pressing joining-direction forward side of the second joining member with respect to the probe inserted position from upper surface side thereof.

With the friction agitation joining apparatus according to the eleventh aspect of the present invention, the friction agitation joining method according to the first aspect of the present invention or the method for manufacturing joined butted members according to the sixth aspect of the present invention can be performed efficiently.

In order to attain the aforementioned first object, according to the twelfth aspect of the present invention, a friction agitation joining apparatus for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, comprises: a first backward pressing roller for pressing joining-direction backward side of the first joining member with respect to a probe inserted position from upper surface side thereof; and a second backward pressing roller for pressing joining-direction backward side of the second joining member with respect to the probe inserted position from upper surface side thereof.

With the friction agitation joining apparatus according to the twelfth aspect of the present invention, the friction agitation joining method according to the second aspect of the present invention or the method for manufacturing joined butted members according to the seventh aspect of the present invention can be performed efficiently.

In order to attain the aforementioned first object, according to the thirteenth aspect of the present invention, a friction agitation joining apparatus for joining a first joining member and a second joining member butted against each other with a level difference formed at upper surface sides thereof by relatively moving the first and second joining members with respect to a rotating probe of a joining tool inserted into a butted portion of the first and second joining members from the upper surface sides so that the probe advances along the butted portion, comprises: a first forward pressing roller for pressing joining-direction forward side of the first joining member with respect to a probe inserted position from upper surface side thereof; and a second forward pressing roller for pressing joining-direction forward side of the second joining member with respect to the probe inserted position from upper surface side thereof; a first backward pressing roller for pressing joining-direction backward side of the first joining member with respect to a probe inserted position from upper surface side thereof; and a second backward pressing roller for pressing joining-direction backward side of the second joining member with respect to the probe inserted position from upper surface side thereof.

With the friction agitation joining apparatus according to the thirteenth aspect of the present invention, the friction agitation joining method according to the third aspect of the present invention or the method for manufacturing joined butted members according to the eighth aspect of the present invention can be performed efficiently.

In any one of the aforementioned eleventh to thirteenth aspects of the present invention, it is preferable to further comprise a third backward pressing roller having a tapered periphery for pressing a joined butted portion of the joining members from surface sides thereof.

It is preferable that the periphery of the third backward pressing roller is cooled.

In any one of the aforementioned eleventh to thirteenth aspects of the present invention, it is preferable to further comprise a cooling roller for cooling a lower surface of a joined butted portion of the first and second joining members by keeping a cooled periphery of the cooling roller in contact with the lower surface.

In any one of the aforementioned eleventh to thirteenth aspects of the present invention, it is preferable that the first forward pressing roller and the second forward pressing roller are separate members, and further comprising an inclination angle changing apparatus for changing an inclination angle of an axis of at least one of rollers including the first forward pressing roller and the second forward pressing roller with respect to a butting direction of the joining members within a plane perpendicular to a joining direction.

Furthermore, it is preferable to further comprise a measuring device for measuring a characteristic concerning a joint state of a joined butted portion of the joining members, and a controller for controls an operation of the inclination angle changing apparatus based on a measured value obtained by the measuring device.

In any one of the aforementioned eleventh to thirteenth aspects of the present invention, it is preferable that the first forward pressing roller and the second forward pressing roller are separate members, and further comprising an inclination angle changing apparatus for changing an inclination angle of an axis of at least one of rollers including the first forward pressing roller and the second forward pressing roller with respect to a butting direction of the joining members within a plane parallel to upper surfaces of the joining members.

In any one of the aforementioned eleventh to thirteenth aspects of the present invention, it is preferable to further comprise a measuring device for measuring a characteristic concerning a joint state of a joined butted portion of the joining members, and a controller for controls an operation of the inclination angle changing apparatus based on a measured value obtained by the measuring device.

In any one of the aforementioned eleventh to thirteenth aspects of the present invention, it is preferable to further comprise a first forward supporting roller for supporting the joining-direction forward side of the first joining member with respect to a probe inserted position from a lower surface side thereof, a second forward supporting roller for supporting the joining-direction forward side of the second joining member with respect to a probe inserted position from a lower surface side thereof, the second forward supporting roller being separated from the first forward supporting roller, and an inclination angle changing apparatus for changing an inclination angle of an axis of at least one of rollers including the first forward supporting roller and the second forward supporting roller with respect to a butting direction of the joining members within a plane parallel to lower surfaces of the joining members.

In any one of the aforementioned eleventh to thirteenth aspects of the present invention, it is preferable to further comprise a first backward supporting roller for supporting the joining-direction backward side of the first joining member with respect to a probe inserted position from a lower surface side thereof, and a second backward supporting roller for supporting the joining-direction forward side of the second joining member with respect to a probe inserted position from a lower surface side thereof, the second backward supporting roller being separated from the first backward supporting roller.

In any one of the aforementioned eleventh to thirteenth aspects of the present invention, it is preferable to further comprise a tension device for giving tension in a direction parallel to a joining direction to at least one of the first joining member and the second joining member.

In any one of the aforementioned eleventh to thirteenth aspects of the present invention, it is preferable to further comprise a heating device for heating a lower surface of a probe inserted position of the butted portion or a lower surface of a joining-direction forward side of the probe inserted position.

In any one of the aforementioned eleventh to thirteenth aspects of the present invention, it is preferable to further comprise a sub-joining tool having a rotatable sub-probe, wherein the rotating sub-probe is inserted into the butted portion or a joined butted portion when the butted portion is joined or is being joined to join a root remaining portion produced at the joined butted portion of the joining members.

In order to attain the aforementioned second object, according to the fourteenth aspect of the present invention, a friction agitation joining apparatus for joining a first joining member and a second joining member butted against each other by relatively moving the first and second joining members with respect to a rotating probe of a joining tool inserted into a butted portion of the first and second joining members from the upper surface sides so that the probe advances along the butted portion, comprises a heating device for heating a lower surface of a probe inserted position of the butted portion or a lower surface of a joining-direction forward side of the probe inserted position.

With the friction agitation joining apparatus according to the fourteenth aspect of the present invention, the friction agitation joining method according to the fourth aspect of the present invention or the method for manufacturing joined butted members according to the ninth aspect of the present invention can be performed efficiently.

In order to attain the aforementioned second object, according to the fifteenth aspect of the present invention, a friction agitation joining apparatus for joining a first joining member and a second joining member butted against each other with upper and lower surfaces being flush with each other by relatively moving the first and second joining members with respect to a rotating probe of a joining tool inserted into a butted portion of the first and second joining members from upper surface sides thereof so that the probe advances along the butted portion, comprises a sub-joining tool having a rotatable sub-probe, wherein the rotating sub-probe is inserted into the butted portion or a joined butted portion when the butted portion is joined or is being joined to join a root remaining portion produced at the joined butted portion of the joining members.

With the friction agitation joining apparatus according to the fifteenth aspect of the present invention, the friction agitation joining method according to the fifth aspect of the present invention or the method for manufacturing joined butted members according to the tenth aspect of the present invention can be performed efficiently.

In the present invention, the language "upper surface side" means a side from which a (main) rotating probe is inserted, and "lower surface side" means a side opposite to the "upper surface side", i.e., a side opposite to the side from which a (main) rotating probe is inserted.

BEST MODE FOR CARRYING OUT THE INVENTION

In order to explain the present invention in detail, the preferred six embodiments according to the present invention will be explained with reference to the attached drawings.

First Embodiment

Figure 1:
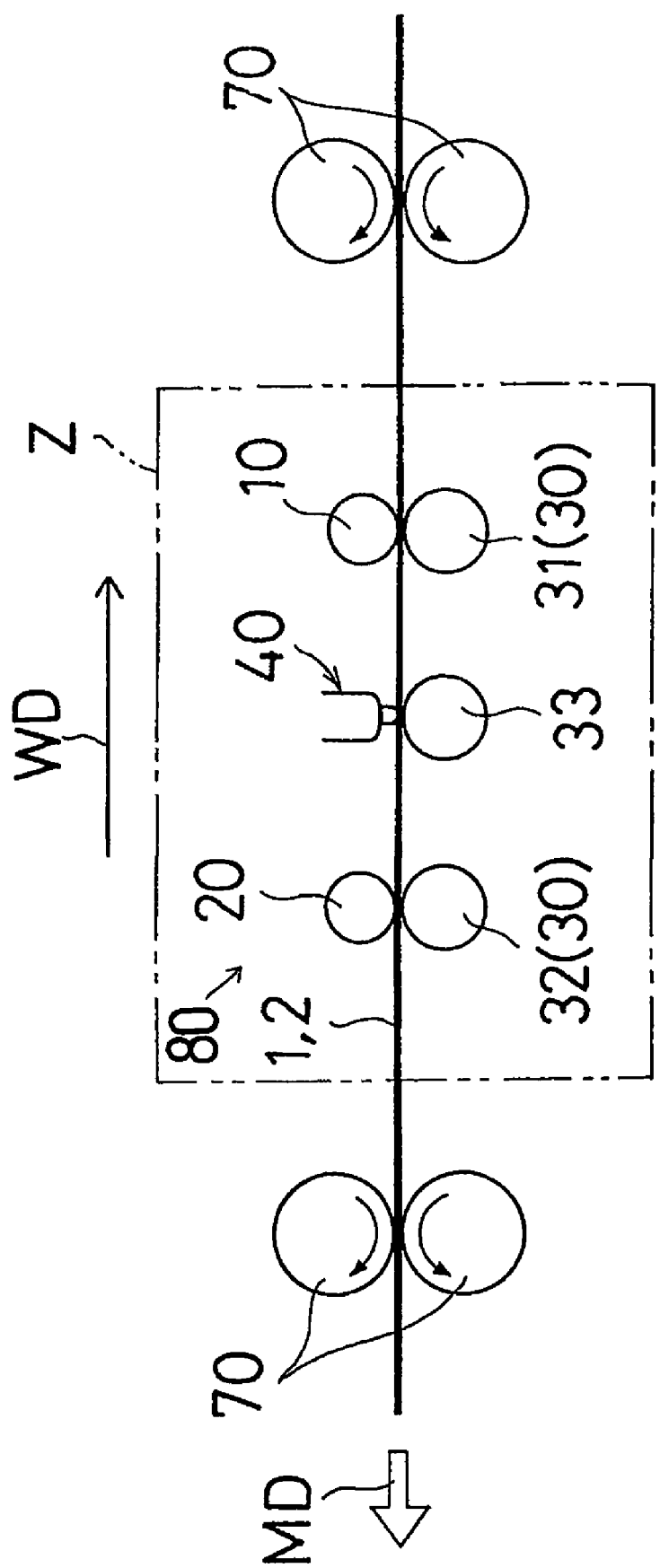
FIG. 1 is a side view showing the state in the middle of joining the butted portion of both the joining members by the friction agitation joining method according to the first embodiment of the present invention.
Figure 2:
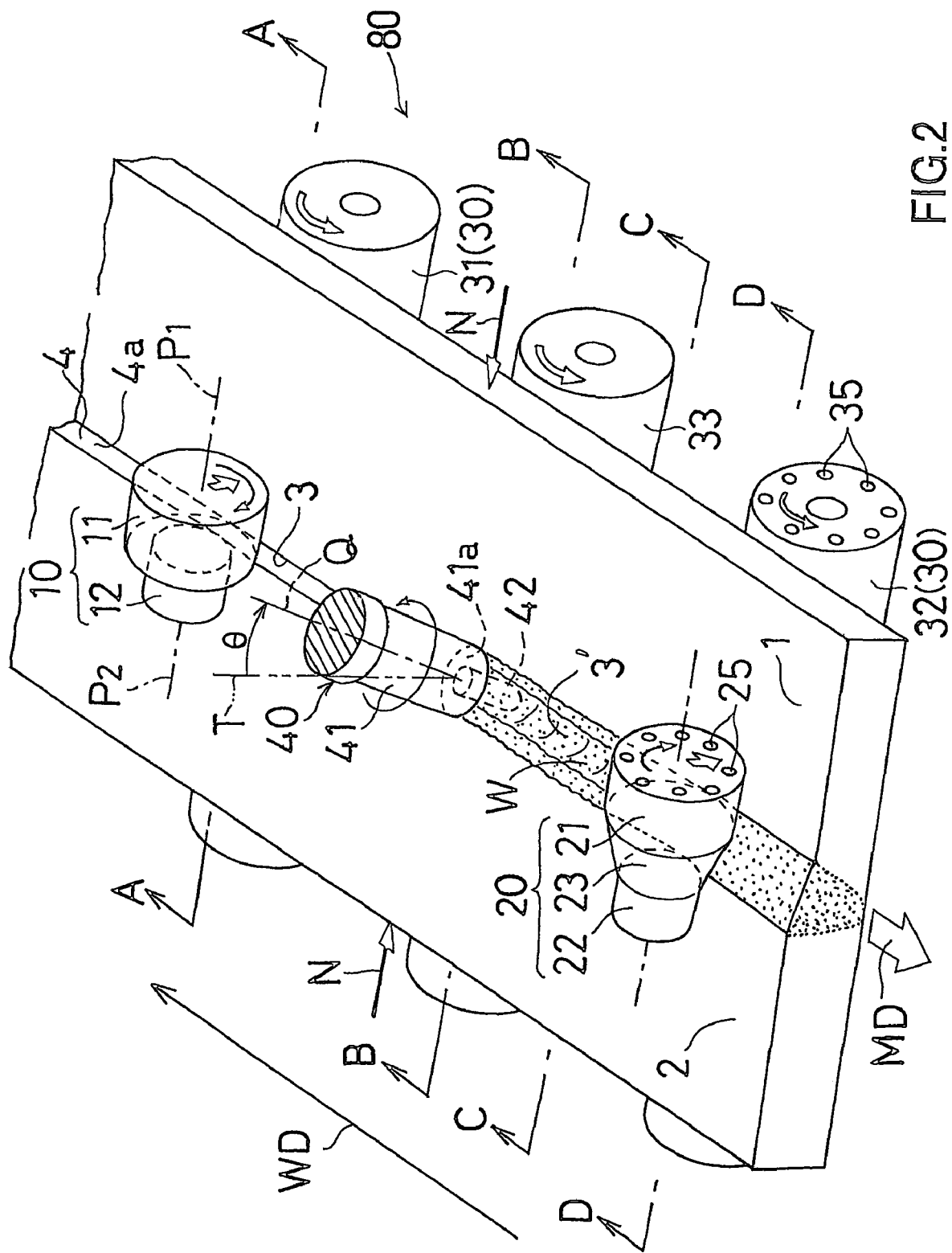
FIG. 2 is an enlarged perspective view showing the Z part shown in FIG. 1.

FIGS. 1 to 7 are drawings for explaining a friction agitation joining method, a method for manufacturing of butted joining members and a friction agitation joining apparatus according to the first embodiment of the present invention. FIG. 1 is a side view showing the state in the middle of joining the butted portion of both the joining members by the friction agitation joining method. FIG. 2 is an enlarged perspective view showing the Z portion in FIG. 1.

In FIG. 2, "1" denotes a thin and long plate-shaped first joining member, and "2" denotes a thick and long plate-shaped second joining member. Each of these joining members 1 and 2 is made of aluminum or its alloy. In this figure, "80" denotes a friction agitation joining apparatus according to the first embodiment. The butted joining members obtained by the friction agitation joining method is used as, for example, tailored blank materials for automobiles.

Figure 4:
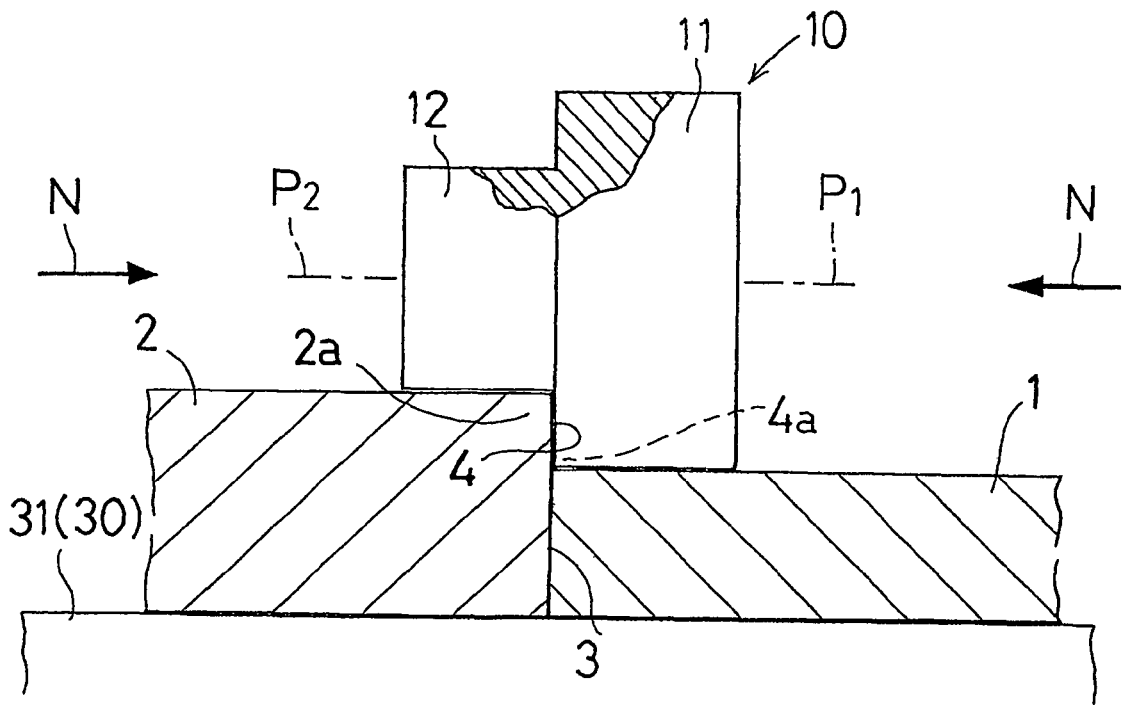
FIG. 4 is a cross-sectional view taken along the line A—A in FIG. 2.

Each joining member 1 and 2 has an upper surface and a lower surface parallel with each other as shown in FIG. 4, and the corresponding widthwise side edges are to be butted against each other. This widthwise side edge is formed to be perpendicular to the upper and lower surfaces of the joining member. The width wise side edges of these two joining members 1 and 2 are butted against each other with the lower surfaces of the joining members being flush with each other ("3" denotes the butted portion). Accordingly, a stepped portion corresponding to the thickness difference is formed at the upper surface side of the joining members. "4"

denotes a stepped portion formed on the upper surfaces of the joining members 1 and 2. "4*a*" denotes the corner portion of this stepped portion 4. Furthermore, "N" denotes a butting direction of each joining member 1 and 2. This butting direction N is parallel to the width direction of the joining member.

As shown in FIG. 2, in this butted state, both the joining members 1 and 2 are supported by the support members 30 in a horizontal state. In this first embodiment, a forward supporting roller 31 and a backward supporting roller 32 are used as a supporting member 30.

Furthermore, as shown in FIG. 1, each joining member 1 and 2 is pulled in the longitudinal direction by forward tension rollers 70 and backward tension rollers 70 equipped to a tension leveler as a tension device in the state in which each joining member is supported by the supporting members 30. Thereby, tension in the longitudinal direction is given to each joining member 1 and 2.

Figure 5:
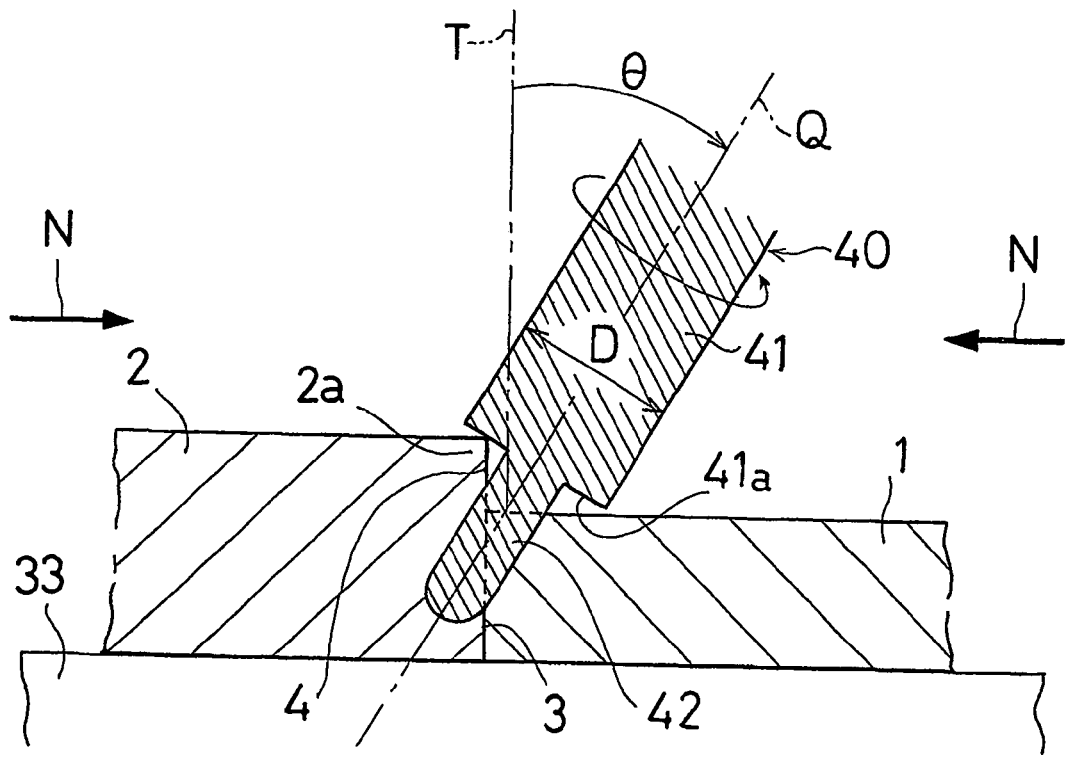
FIG. 5 is a cross-sectional view taken along the line B—B FIG. 2.

In FIG. 2, "40" denotes a joining tool for friction agitation joining. This joining tool 40 is equipped with a columnar rotor 41 having a larger diameter and a pin-shaped probe 42 having a smaller diameter. The probe 42 is projected from the rotational center of the end face 41*a* of the rotor 41 along the rotation axis Q. In FIG. 2, this probe 42 of the joining tool 40, which is rotating about the rotation axis Q, is inserted into the butted portion 3 of the joining members 1 and 2 from the upper surface side of the joining members. In this inserted state, as shown in FIG. 5, the rotation axis Q of the rotor 41 and the probe 42 is arranged in the state in which the rotation axis Q is inclined toward the first joining member 1 (namely, the joining member at the lower level side). The end face 41*a* of the rotor 41 is disposed in the state in which the end face 41*a* is pressed against the shoulder portion 2*a* of the second joining member 2 (namely, the shoulder portion of the joining member at the higher level) projected from the butted portion 3. In FIG. 5, "T" denotes a normal line of the surface at the probe inserted position of the joining members. "θ" denotes the inclination angle of the rotation axis Q toward the first joining member 1 with respect to the aforementioned "T."

In this joining tool 40, both of the rotor 41 and the probe 42 are made of heat-resisting materials that is harder than the joining members 1 and 2 and that can bear frictional heat generated at the time of joining. On the periphery of the probe 42, agitating protrusions (not shown) for agitating the materials of the joining members 1 and 2 softened by frictional heat are formed in a spiral manner or the like.

In FIG. 5, "D" denotes the diameter of the end face 41*a* of the rotor 41. At least the peripheral edge of the end face 41*a* of this rotor 41 is formed within a plane perpendicular to the rotation axis Q. In this first embodiment, the end face 41*a* of the rotor 41 is a flat surface. In addition, in the present invention, although it is not illustrated, the end face 41*a* of the rotor 41 may be formed into a configuration depressing toward the center of the rotation from the peripheral edge thereof.

In this first embodiment, as shown in FIG. 2, the butted portion 3 of both the joining members 1 and 2 are to be joined by moving the joining members 1 and 2 in one longitudinal direction thereof (the moving direction is shown as "MD") in a state in which the probe 42 is inserted from the upper surface side into the butted portion 3 as mentioned above and the tension in the longitudinal direction of the joining members 1 and 2 is given to both the joining members 1 and 2 so that the probe 42 advances the butted portion 3. Accordingly, in this first embodiment, the joining direction WD coincides with a direction opposite to the moving direction MD of the joining members 1 and 2. Furthermore, the longitudinal direction of each joining member 1 and 2 coincides with a direction parallel to the joining direction WD. In FIG. 2, "3'" denotes the joined butted portion of the joining members 1 and 2 joined by the probe 42. "W" denotes a joined portion formed in the joined butted portion 3'.

Figure 3:
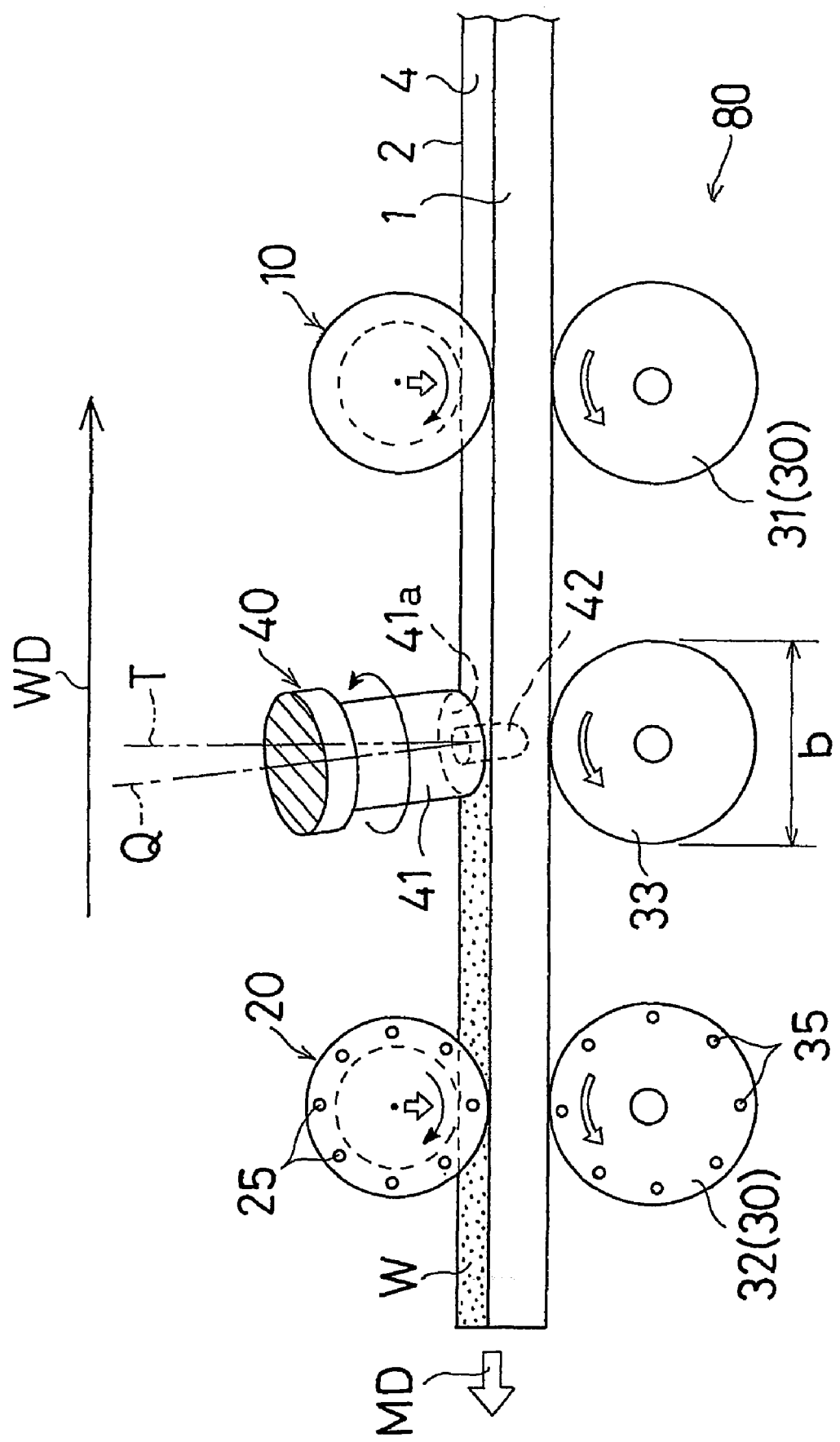
FIG. 3 is a side view of FIG. 2.

At the time of joining, as shown in FIG. 3, the rotation axis Q of the joining tool 40 is slightly inclined toward the joining-direction backward side. Thereby, the joining-direction forward side of the end face 41*a* of the rotor 41 is lifted up from the upper surface of the joining members 1 and 2. This prevents the joining-direction forward side of the end face 41*a* of the rotor 41 from being caught by the minute unevenness which may exist on the upper surface of the joining members 1 and 2, resulting in a smooth advancing movement of the probe 42 along the butted portion 3.

Next, the structure of the friction agitation joining apparatus 80 according to the first embodiment will be explained. In FIG. 2, "33" denotes a backing roller. This backing roller 33 has a columnar-shape having a predetermined length. This backing roller 33 is disposed at the lower surface side of the joining members 1 and 2 such that the roller is opposed to the probe 42 of the joining tool 40 and bridges over both the joining members 1 and 2. By this backing roller 33, joining members 1 and 2 are supported at the lower surface of the probe inserted position of the butted portion 3. This backing roller 33 also plays a role for supporting both the joining members 1 and 2 as a supporting member 30.

The support member 30 is equipped with the forward supporting roller 31 and the backward supporting roller 32. The forward supporting roller 31 is a column-shaped member having a predetermined length. Similarly, the backward supporting roller 32 is a column-shaped member having a predetermined length. At the joining-direction forward side of the joining members 1 and 2 with respect to the probe inserted position, the forward supporting roller 31 is disposed at the lower surface side of the joining members 1 and 2 in a state in which the axis of the roller 31 is parallel to the butting direction N and the roller 31 bridges over both the joining members 1 and 2. Similarly, at the joining-direction backward side of the joining members 1 and 2 with respect to the probe inserted position, the backward supporting roller 32 is disposed at the lower surface side of the joining members 1 and 2 in a state in which the axis of the roller 32 is parallel to the butting direction N and the roller 32 bridges over both the joining members 1 and 2. By these forward supporting roller 31 and the backward supporting roller 32, both the joining members 1 and 2 are supported from the lower surface side thereof at the joining-direction forward side and the joining-direction backward side of the joining members 1 and 2 with respect to the probe inserted position.

The forward supporting roller 31, the backward supporting roller 32 and the backing roller 33 are connected to a rotation driving device (not shown). By operating this rotation driving device, these rollers 31, 32 and 33 are rotated about the axis thereof at a constant circumferential speed at a fixed position, respectively. Accordingly, these rollers 31, 32 and 33 also function as driving rollers for moving the joining members 1 and 2 in a prescribed direction MD. In the present invention, the backing roller 33 may be rotated freely. Furthermore, the forward and backward supporting rollers 31 and 32 may be rotated freely in cases where a driving device for moving the joining members 1 and 2 in the predetermined direction MD is provided separately.

Furthermore, the backward supporting roller 32 also functions as a cooling roller. That is, at the peripheral surface portion of the backward supporting roller 31, a plurality of coolant circulation passages 35 arranged in the circumferential direction thereof are provided. Each passage extends in the longitudinal direction of the roller 32. The coolant (e.g., cooling water) is circulating in these coolant circulation passages 35. Thereby, the peripheral portion of the backward supporting roller 32 is in a cooled state. At the time of supporting the joining members 1 and 2, the cooled peripheral portion of the backward supporting roller 32 comes into contact with the lower surface of the joined butted portion 3', to thereby cool the joined butted portion 3' from the lower surface thereof.

In FIG. 2, "11" denotes a first forward pressing roller. "12" denotes a second forward pressing roller. The first forward pressing roller 11 is a rotatable columnar-shaped member having a larger diameter and a predetermined length. The second forward pressing roller 12 is a rotatable columnar-shaped member having a smaller diameter and a predetermined length. As shown in FIGS. 2 and 4, at the upper surface side of the first joining member 1, the first forward pressing roller 11 is disposed above the forward supporting roller 31 in a state in which the axis P1 of the roller 11 is parallel to the butting-direction N of the first joining member 1 at the joining-direction forward side of the first joining member 1 with respect to the probe inserted position. Similarly, at the upper surface side of the second joining member 2, the second forward pressing roller 12 is disposed above the forward supporting roller 31 in a state in which the axis P2 of the roller 12 is parallel to the butting-direction N of the second joining member 2 at the joining-direction forward side of the second joining member 2 with respect to the probe inserted position.

In this first embodiment, the first forward pressing roller 11 and the second forward pressing roller 12 are integrally connected in a state in which the axes thereof are arranged on the same straight-line and the end faces thereof are butted against each other. This integrated roller 10 is referred to as "forward pressing roller" in this first embodiment.

In this forward pressing roller 10, the difference between the radius of the first forward pressing roller 11 and that of the second pressing roller 12 coincides with the level difference formed on the upper surface of the joining members 1 and 2 (namely, the height-difference between the upper surface of the first joining member 1 and that of the second joining member 2).

By the first forward pressing roller 11, the area at the joining-direction forward side of the first joining member 1 covering from the widthwise intermediate portion of the first joining member 1 to the portion near the butted portion 3 is pressed downwardly from the upper surface side. Similarly, by the second forward pressing roller 12, the area at the joining-direction forward side of the first joining member 2 covering from the widthwise intermediate portion of the second joining member 2 to the portion near the butted portion 3 is pressed downwardly from the upper surface side.

Since the forward pressing rollers 10 presses these joining members 1 and 2, the lower surfaces of the joining members 1 and 2 are pressed against the periphery of the forward supporting roller 31. Thereby, driving force in the moving direction MD can be given to the joining members 1 and 2. On the other hand, in accordance with the movement of these joining member 1 and 2, the first and second forward pressing rollers 11 and 12 integrally rotate about the axis P1 and P2 at a predetermined position.

In FIG. 2, "21" and "22" denote a first backward pressing roller and a second backward pressing roller, respectively.

The first backward pressing roller 21 is a rotatable column-shaped member having a larger diameter and a predetermined length. The second backward pressing roller 22 is a rotatable column-shaped member having a smaller diameter and a predetermined length.

Figure 7:
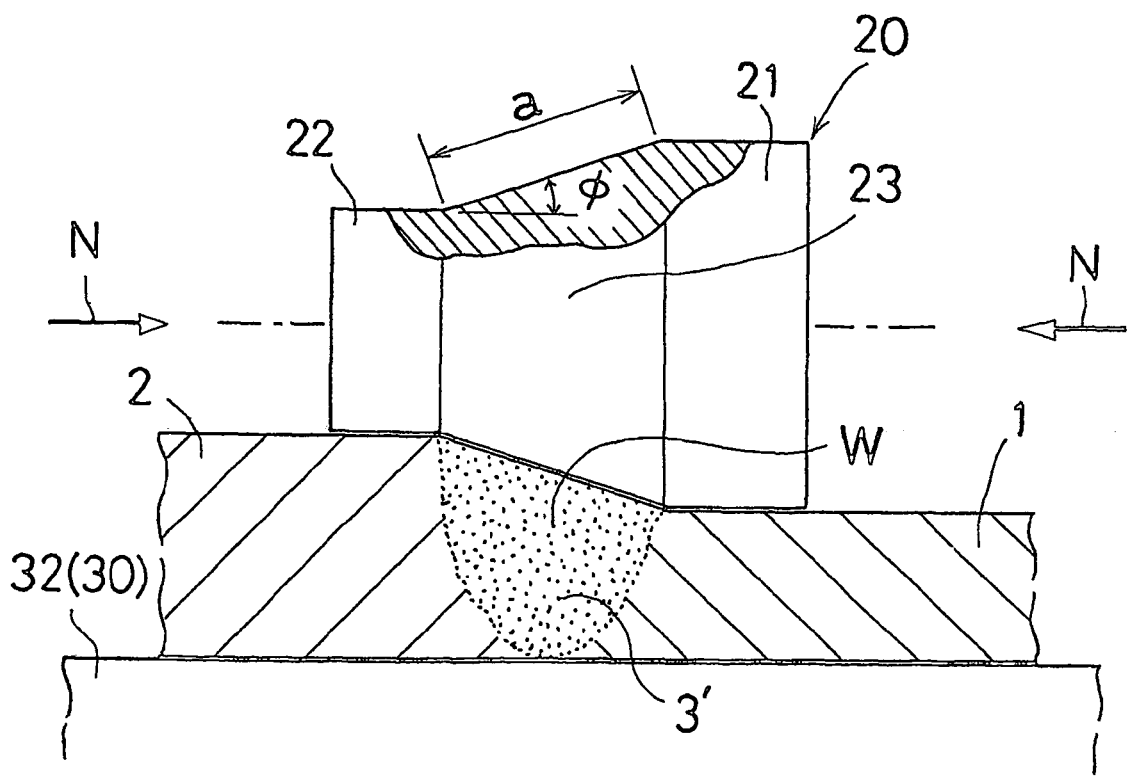
FIG. 7 is an enlarged cross-sectional view taken along the line D—D in FIG. 2.

As shown in FIGS. 2 and 7, at the upper surface side of the first joining member 1, the first backward pressing roller 21 is disposed above the backward supporting roller 32 in a state in which the axis of the roller 21 is parallel to the butting-direction N of the first joining member 1 at the joining-direction backward side of the first joining member 1 with respect to the probe inserted position. Similarly, at the upper surface side of the second joining member 2, the second backward pressing roller 22 is disposed above the backward supporting roller 32 in a state in which the axis of the roller 22 is parallel to the butting-direction N of the second joining member 2 at the joining-direction backward side of the second joining member 2 with respect to the probe inserted position. In FIG. 2, "23" is a third backward pressing roller. This third backward pressing roller 23 is a rotatable truncated cone-shaped member, and therefore the peripheral surface thereof is a tapered surface. This third backward pressing roller 23 is used for pressing the joined butted portion 3' of the joining members 1 and 2 from the upper surface thereof. At the upper surface side of the joining members 1 and 2, the third backward pressing roller 23 is disposed above the backward supporting roller 32 in a state in which the axis of the roller 23 is parallel to the butting-direction N of the joining members 1 or 2.

In this first embodiment, the first backward pressing roller 21, the third backward pressing roller 23 and the second backward pressing roller 22 are integrally connected in a state in which the axes are arranged on the same straight line in this order and adjacent end faces are butted against each other. This integrated roller 20 is referred to as a "backward pressing roller" in the first embodiment.

In this backward pressing roller 20, the difference between the radius of the first backward pressing roller 21 and the second backward pressing roller 22 coincides with the level difference formed on the upper surfaces of the joining members 1 and 2. Furthermore, the periphery of the first backward pressing roller 21 and the periphery of the second backward pressing roller 22 are continuously connected via the periphery (namely, tapered surface) of the third backward pressing roller 23.

By the first backward pressing roller 21, the area at the joining-direction backward side of the first joining member 1 covering from the widthwise intermediate portion of the first joining member 1 to the portion near the joined butted portion 3' is pressed downwardly from the upper surface side. Similarly, by the second backward pressing roller 22, the area at the joining-direction backward side of the second joining member 2 covering from the widthwise intermediate portion of the second joining member 2 to the portion near the joined butted portion 3' is pressed downwardly from the upper surface side.

Furthermore, at the peripheral surface portion of the third backward pressing roller 23, as shown in FIG. 2, a plurality of coolant circulation passages 25 arranged in the circumferential direction thereof are provided. Each passage extends in the longitudinal direction of the roller 23 so as to penetrate the first backward pressing roller 21 and the second backward pressing roller 22. The coolant (e.g., cooling water) is circulating in these coolant circulation passages 25. Thereby, the peripheral portion of the third backward pressing roller 23 is in a cooled state. At the time of pressing the joined butted portion 3', the cooled peripheral portion of the third backward pressing roller 23 comes into contact with the upper surface of the joined butted portion 3', to thereby cool the joined butted portion 3' from the upper surface thereof.

Since the backward pressing roller 20 presses these joining members 1 and 2, the lower surfaces of the joining members are pressed against the periphery of the backward supporting roller 32. Thereby, driving force in the moving direction MD can be given to the joining members 1 and 2. On the other hand, in accordance with the movement of these joining member 1 and 2, the first to third backward pressing rollers 21, 22 and 23 integrally rotate about the axis at a predetermined position.

Next, the joining steps of the friction agitation joining method of the first embodiment will be explained.

First, tension in a direction parallel to the joining direction (i.e., the longitudinal direction) is given to each joining member 1 and 2 by tension rollers 70 and 70. This corrects the twist, curvature and deflection of each joining member 1 and 2, and suppresses the surface vibration of each joining member 1 and 2. The tension may be given during the joining process.

Furthermore, an area of the joining-direction forward side of the first joining member 1 covering from the widthwise intermediate portion thereof to a portion near the butted portion 3 is pressed by the first forward pressing roller 11 from the upper surface side, and an area of the joining-direction forward side of the second joining member 2 covering from the widthwise intermediate portion thereof to a portion near the butted portion 3 is pressed by the second forward pressing roller 12 from the upper surface side.

The torsion of each joining member 1 and 2 is further corrected by being pressed as mentioned above, causing an adhesion of the butted portion 3 of the joining members 1 and 2. As a result, no clearance will be generated at the butted portion 3. Thus, both the joining members 1 and 2 are moved by receiving the driving force of the forward supporting roller 31 in the adhered state.

At certain timing, the probe 42 is rotated by rotating the rotor 41 of the joining tool 40. Then, the rotating probe 42 is inserted into the butted portion 3 of the joining members 1 and 2 from the upper surface side of thereof with the rotation axis Q inclined toward the first joining member side 1. Furthermore, the end face 41a of the rotor 41 is pushed against the shoulder portion 2a of the second joining member 2. The insertion of the probe 42 into the butted portion 3 may be performed from a longitudinal end of the joining members 1 and 2. Furthermore, inclining the rotation axis Q toward the first joining member side 1 may be performed after the insertion of the probe 42 into the butted portion 3.

Due to the frictional heat generated in accordance with the rotation of the probe 42 and the frictional heat generated by the mutual contact between the end face 41a of the rotor 41 and the shoulder portion 2a of the second joining member 2, the probe-inserted portion of the butted portion 3 of the joining members 1 and 2 and therearound are softened, the shoulder portion 2a of the second joining member 2 is plastically deformed into an inclined surface by being pressed by the end surface 41a of the rotor 41. Furthermore, due to this plastic deformation, a part of the materials of the shoulder portion 2a is filled in the corner portion 4a of the stepped portion 4.

Figure 6:
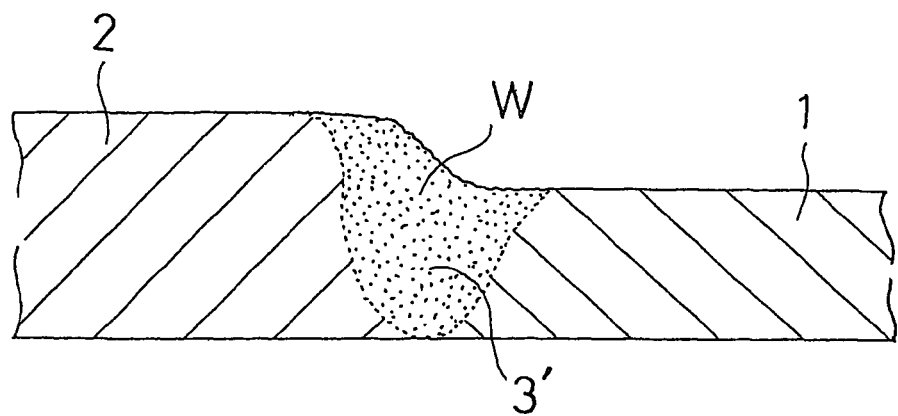
FIG. 6 is an enlarged cross-sectional view taken along the line C—C in FIG. 2.

The materials of the joining members 1 and 2 softened by the frictional heat is agitated and mixed by the rotational force of the probe 42 while the corner portion 4a is being filled up with a part of the materials of the shoulder portion 2a. In accordance with the advance movement of the joining members 1 and 2, the softened materials are plastically fluidized to go around the probe 42 to fill up a groove formed behind the advancing probe 42. Then, the softened and agitated materials will be cooled and solidified by the immediate loss of the friction heat. Thus, the butted portion 3 of the joining members 1 and 2 is joined as the probe 42 advances. At this time, as mentioned above, the rotation axis Q of the joining tool 40 is inclined toward the first joining member side 1, and a part of the materials of the shoulder portion 2a of the second joining member 2 fills the corner portion 4a. Therefore, the surface of the joined butted portion 3' is formed into an inclined surface bridging the surface of the first joining member 1 and that of the second joining member 2, as shown in FIG. 6. As shown in FIG. 6, the minute unevenness such as burrs are formed on the surface of the joined butted portion 3'.

While joining the butted portion 3 with the probe 42 in this way, the joining members 1 and 2 are moved and introduced between the backward supporting roller 32 and the first to third pressing rollers 21, 22 and 23. Then, an area of the joining-direction backward side of the first joining member 1 with respect to the probe-inserted position covering from the widthwise intermediate portion to a portion near the joined butted portion 3' is pressed by the first backward pressing roller 21 from the upper surface side, and an area of the joining-direction backward side of the second joining member 2 with respect to the probe-inserted position covering from the widthwise intermediate portion to a portion near the joined butted portion 3' is pressed by the second backward pressing roller 22 from the upper surface side. Furthermore, the joined butted portion 3' is pressed by the third backward pressing roller 23 from the upper surface side.

In this way, both the joining members 1 and 2 are pressed by the backward pressing roller 20. Thereby, the twist and curvature of each joining member 1 and 2 are further corrected. Furthermore, since the periphery of the third backward pressing roller 23 is formed into a tapered surface, when the joined butted portion 3' is pressed by this third backward pressing roller 23, the joined butted portion 3' is pressurized. As a result, the surface is formed into a gentle inclined surface as shown in FIG. 7. At the same time, the minute unevenness formed on the upper surface of the joined butted portion 3' is pressed and removed. Thereby, the surface of the joined butted portion 3' is smoothed with the gently inclined state. Furthermore, when the joined butted portion 3' is pressed, the tensile residual stress produced on the surface of the joined butted portion 3' is converted into compression residual stress. Accordingly, the durability of the butted joining members to be obtained can be improved.

When the joining end scheduled portion of the butted portion 3 of the joining members 1 and 2 arrives the position of the probe 42, the probe 42 is removed therefrom, and the joining is completed. Thus, desired joined butted joining members can be obtained by the aforementioned joining operation.

As shown in FIG. 7, where the width and the taper angle of the periphery of the third backward pressing roller 23 are "a" and $\phi$, respectively, the width "a" is set to be larger than the diameter D of the end face 41a of the rotor 41 of the joining tool 40 (namely, a>D), and the taper angle $\phi$ is set to be smaller than the inclination angle $\theta$ of the rotation axis Q to a normal line T toward the first joining member side 1 (namely, $\phi<\theta$). This setting makes it possible to assuredly form a desired inclined surface of the joined butted portion 3'. Furthermore, the minute unevenness can be assuredly removed by being pressurized.

Furthermore, since the upper surface of the joined butted portion 3' comes into contact with the cooled periphery of the third backward pressing roller 23, the joined butted portion 3' will be quenched from the upper surface. Accordingly, the joining strength improves, and furthermore superfluous heat, which may be sometimes generated in the joined butted portion 3', is removed, resulting in a good joining status. Furthermore, since the lower surface of the joined butted portion 3' comes into contact with the cooled periphery of the backward supporting roller 32, the butted portion 3' will be also quenched from the lower surface. Accordingly, the joining strength further improves.

In the present invention, the diameter "b" of the backing roller 33 is set to be equal to the diameter D of the end face 41a of the rotor 41 of the joining tool 40 or larger than D (namely, b≧D), where the diameter of the backing roller 33 is "b" (see FIG. 3). By setting the diameter "b" as mentioned above, the materials of the joining members softened by the frictional heat can be received from the lower surface side assuredly.

In this friction agitation joining method, since the joining-direction forward side of each joining member 1 and 2 with respect to the probe inserted position is pressed and the joining-direction backward side of each joining member 1 and 2 with respect to the probe inserted position is pressed at the time of joining, the curvature and the torsion of each joining member 1 and 2 can be more assuredly corrected. Then, since the joining of the butted portion 3 is performed in this state, the generation of poor junction such as joining defect or thermal distortion can be prevented more assuredly. Furthermore, since the butted portion 3 is joined in a state in which a portion near the butted portion at the joining-direction forward side of each joining member with respect to the probe inserted position is being pressed, the end portion of each joining member to be butted against each other can be pressed firmly. Therefore, the generation of poor junction can be prevented more assuredly.

Moreover, since tension in a direction parallel to the joining direction WD is given to each joining member 1 and 2, configuration defects, such as curvature, twist and deflection, can be corrected more assuredly, and surface vibration of each joining member 1 and 2 can be suppressed. Accordingly, the generation of poor junction can be prevented more assuredly.

Furthermore, in this friction agitation joining apparatus 80, since the first forward pressing roller 11 and the second forward pressing roller 12 are integrally connected, the structure of the supporting jig for supporting these rollers can be simplified.

Furthermore, in the butted joining members joined by the friction agitation joining method, since the joined butted portion 3' is in a quenched state, high joining strength can be obtained. Moreover, since the upper surface of the joined butted portion 3' is formed into an inclined surface bridging over the surface of the first joining member 1 and that of the second joining member 2, the obtained butted joining members can relieve the stress concentration produced in the stepped portion 4. Accordingly, outstanding reliability in strength can be obtained.

Furthermore, since the upper surface of the joined butted portion 3' is smoothened in an inclined state by removing the minute unevenness such as burrs by pressing them, a good surface state can be obtained. Accordingly, even in cases where the upper surface of the butted joining members is painted, a film can be formed on the upper surface of the joined butted portion 3' in a good condition.

EXAMPLES

Next, concrete examples of the friction agitation joining method according to the first embodiment will be shown.

First, a long plate-shaped first joining member made of aluminum alloy (Materials: JIS A5052-O, Dimension: length 1000 mm×Width 100 mm×Thickness 2 mm) and a long plate-shaped second joining member made of aluminum alloy (Materials: JIS A5052-O, Dimension: length 1000 mm×Width 100 mm×Thickness 3 mm) were prepared.

As a joining tool 40, a tool having a rotor 41 with a probe 41a was prepared. The diameter D of the end face 41a of a rotor 41 was 9 mm, and the protrusion length of the probe 42 from the rotor end face 41a was 2.3 mm. The probe 42 had an M3 screw axial portion.

Figure 8A:
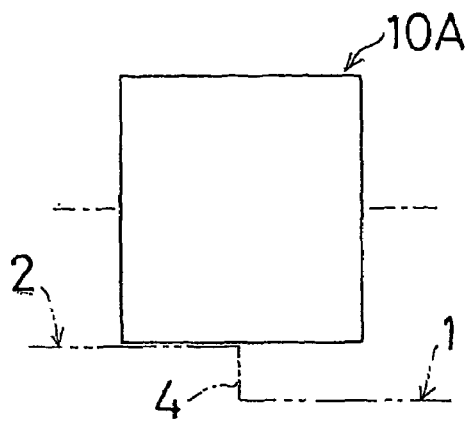
FIG. 8 is a front view showing forward pressing rollers and backward pressing rollers used in the embodiments and the comparative embodiments.
Figure 8B:
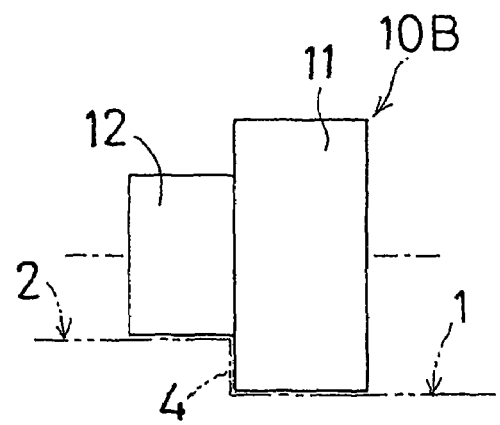
Figure 8C:
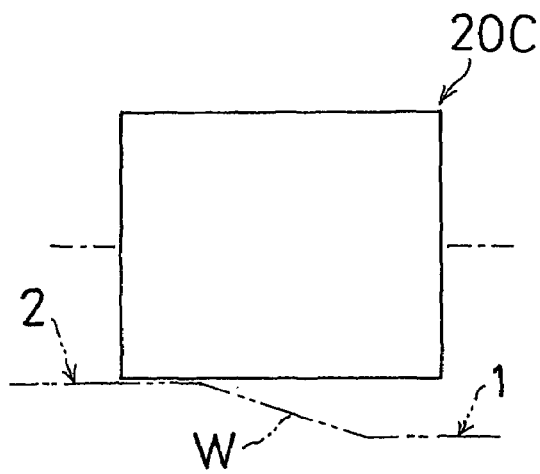
Figure 8D:
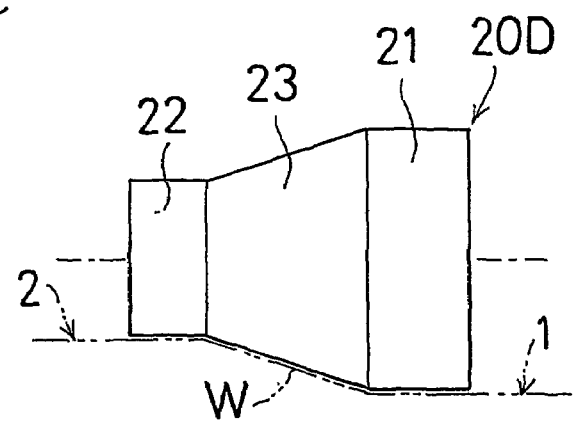
Figure 8E:
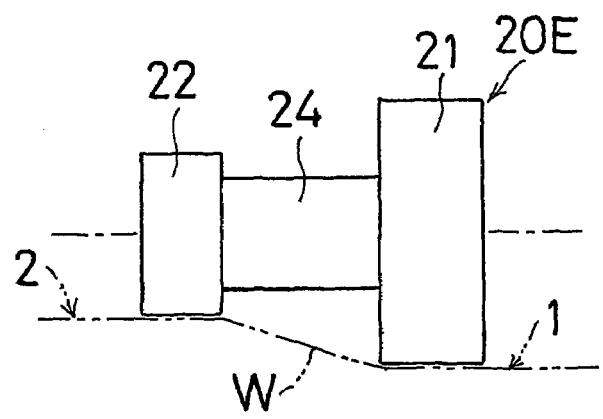

As forward pressing rollers 10, the rollers as shown in FIGS. 8A and 8B were prepared, while as backward pressing rollers 20, the rollers as shown in FIGS. 8C to 8E were prepared. The structure of each roller was as follows.

The forward pressing roller 10A shown in FIG. 8A is the same column-shaped member as the conventional one, and is disposed so as to cover the butted portion.

The forward pressing roller 10B shown in FIG. 8B has the same structure as the roller 10 of the first embodiment.

The backward pressing roller 20C shown in FIG. 8C has the same columnar-shape member as the conventional one.

The backward pressing roller 20D shown in FIG. 8D has the same structure as the roller 20 of the first embodiment.

The backward pressing roller 20E shown in FIG. 8E comprises a first backward pressing roller 21, a second backward pressing roller 22 and a columnar connecting axial portion 24 having a diameter smaller than that of the second backward pressing roller 22. The first backward pressing roller 21 and the second backward pressing roller 22 are integrally connected by the columnar connecting axial portion 24. In other words, the backward pressing roller 20E does not have a third backward pressing roller for pressing the joined butted portion 3'. This backward pressing roller 20E is arranged so that the first and second backward pressing rollers 21 and 22 are disposed besides the joined butted portion.

Example 1

The side edge of the first joining member 1 and that of the second joining member 2 were butted against each other with the lower surfaces thereof being flush with each other. Then, the butted portion 3 was joined along the entire length thereof by the joining method of the first embodiment. In this joining, the roller 10B shown in FIG. 8B was used as the forward pressing roller, and the roller 20D shown in FIG. 8D was used as the backward pressing roller. The joining was performed under the following conditions: the rotating speed of the rotor 41 of joining tool 40 was 1,000 rpm; the joining rate was 700 mm/min; the inclination angle θ of the rotation axis Q of the joining tool 40 toward the first joining member 1 was 5°.

Example 2

The forward pressing roller 10B shown in FIG. 8B and the backward pressing roller 20C shown in FIG. 8C were used. The butted portion 3 of the joining members 1 and 2 was joined along the entire length thereof. Other joining conditions were the same as the aforementioned example 1.

Example 3

The forward pressing roller 10A shown in FIG. 8A and the backward pressing roller 20D shown in FIG. 8D were used. The butted portion 3 of the joining members 1 and 2 was joined along the entire length thereof. Other joining conditions were the same as the aforementioned example 1.

Example 4

The forward pressing roller 10A shown in FIG. 8A and the backward pressing roller 20E shown in FIG. 8E were used. The butted portion 3 of the joining members 1 and 2 was joined along the entire length thereof. Other joining conditions were the same as the aforementioned example 1.

Comparative Example

The forward pressing roller 10A shown in FIG. 8A and the backward pressing roller 20C shown in FIG. 8C were used. The butted portion 3 of the joining members 1 and 2 was joined along the entire length thereof. Other joining conditions were the same as the aforementioned example 1.

About the butted joining members obtained by the aforementioned examples 1–4 and the comparative example, the surface state of the joined butted portion was investigated with the naked eye, and the amount of thermal distortion was investigated.

TABLE 1

| | Forward pressing roller | Backward pressing roller | Surface state of the joined butted portion(*) | Thermal distortion |
|---|---|---|---|---|
| Example 1 | Roller shown in FIG. 8B | Roller shown in FIG. 8D | ○ | 3 mm |
| Example 2 | Roller shown in FIG. 8B | Roller shown in FIG. 8C | Δ | 3 mm |
| Example 3 | Roller shown in FIG. 8A | Roller shown in FIG. 8D | ○ | 5 mm |
| Example 4 | Roller shown in FIG. 8A | Roller shown in FIG. 8E | Δ | 5 mm |
| Comparative Example | Roller shown in FIG. 8A | Roller shown in FIG. 8C | Δ | 10 mm |

Notes(*):
○: Very good
Δ: Good

About the amount of thermal distortion in Table 1, the amount of the maximum curvature of the obtained butted joining members disposed on a flat surface is shown as the amount of thermal distortion.

As shown in this table, in the butted joining members obtained by the comparative example, the amount of thermal distortion was 10 mm, and a large thermal distortion was generated. On the other hand, in the butted joining members obtained by the examples 1 to 4, the amount of thermal distortion was 5 mm or less, and the generation of thermal distortion was suppressed. Especially in the butted joining members of examples 1 and 2, the amount of thermal distortion was 3 mm, and the generation of thermal distortion was further suppressed.

Furthermore, in the butted joining members obtained by the comparative example, the non-joined portion was generated in the joined butted portion, and the poor joining was generated. On the other hand, in the butted joining members obtained by the examples 1 to 4, a non-joined portion was not generated, and the joining state was good.

Furthermore, in the butted joining members obtained by the examples 2, 4 and the comparative example, minute unevenness such as burrs were formed on the upper surface of the joined butted portion. To the contrary, in the butted joining members obtained by the examples 1 and 3, such minute unevenness was not formed on the upper surface of the joined butted portion. This surface was smoothened with an inclined state, and the surface state was very good.

Second Embodiment

FIGS. 9 to 16 are drawings for explaining a friction agitation joining method, a method for manufacturing of butted joining members and a friction agitation joining method according to the second embodiment of the present invention. In these figures, the same reference numeral is allotted to the same component as in the aforementioned first embodiment. Hereinafter, this second embodiment will be explained by focusing on the differences between the first embodiment and the second embodiment.

Figure 9:
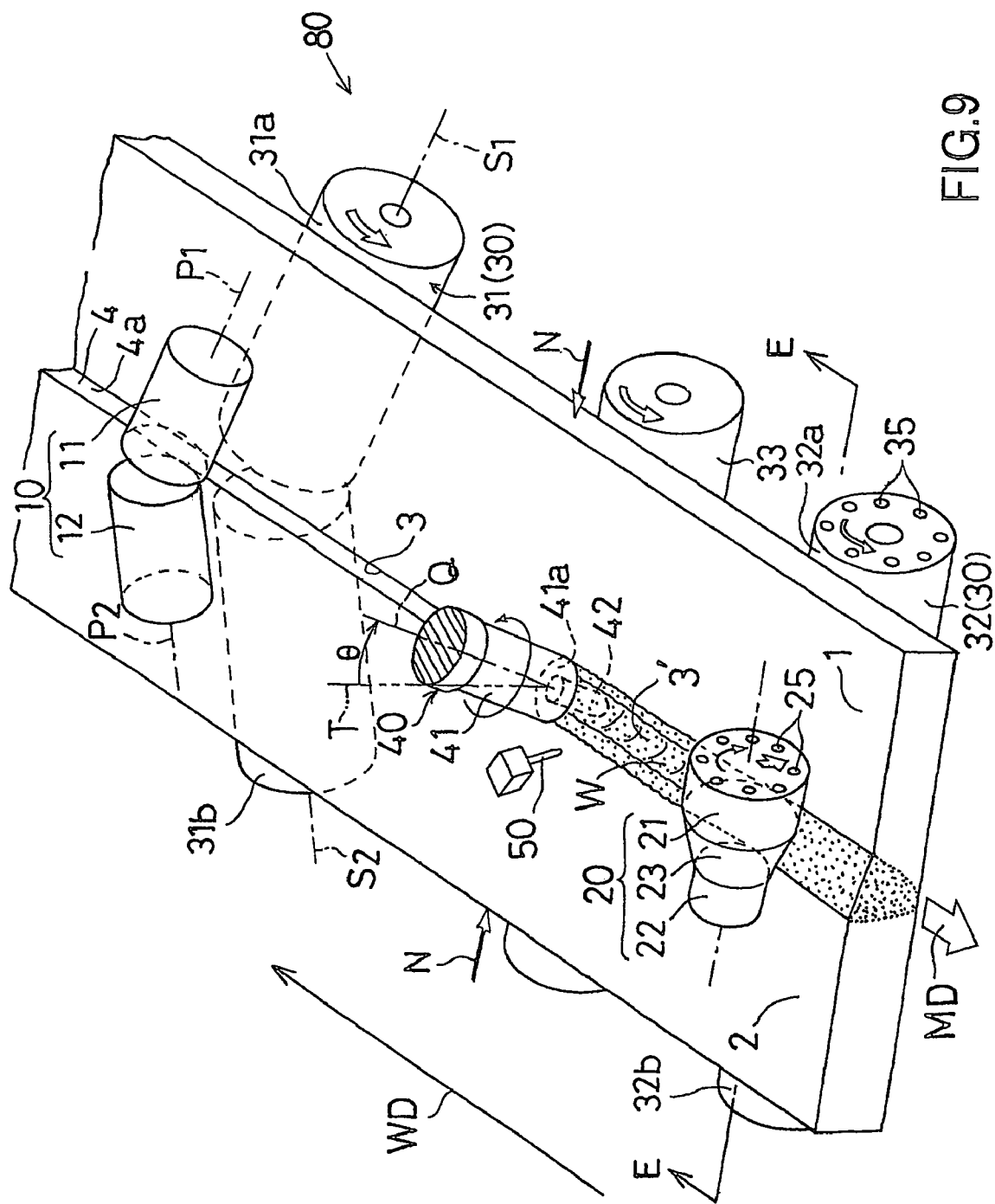
FIG. 9 is a perspective view corresponding to FIG. 2 showing the state in the middle of joining the butted portion of both the joining members by the friction agitation joining method according to the second embodiment of the present invention.

In this second embodiment, as shown in FIG. 9, the forward pressing roller 10 is divided into the first forward pressing roller 11 and the second forward pressing roller 12. That is, the first forward pressing roller 11 and the second forward pressing roller 12 are separate members. The outer diameter of first forward pressing roller 11 and that of the second forward pressing roller 12 have the same dimension.

In FIG. 9, "50" denotes a thermometry apparatus (e.g., radiation thermometer) for measuring the surface temperature of the joined butted portion 3' of the joining members 1 and 2. This thermometry apparatus 50 is arranged between the probe inserted position at the upper surface side of the joining members 1 and 2 and the third backward pressing roller 23.

Figure 10:
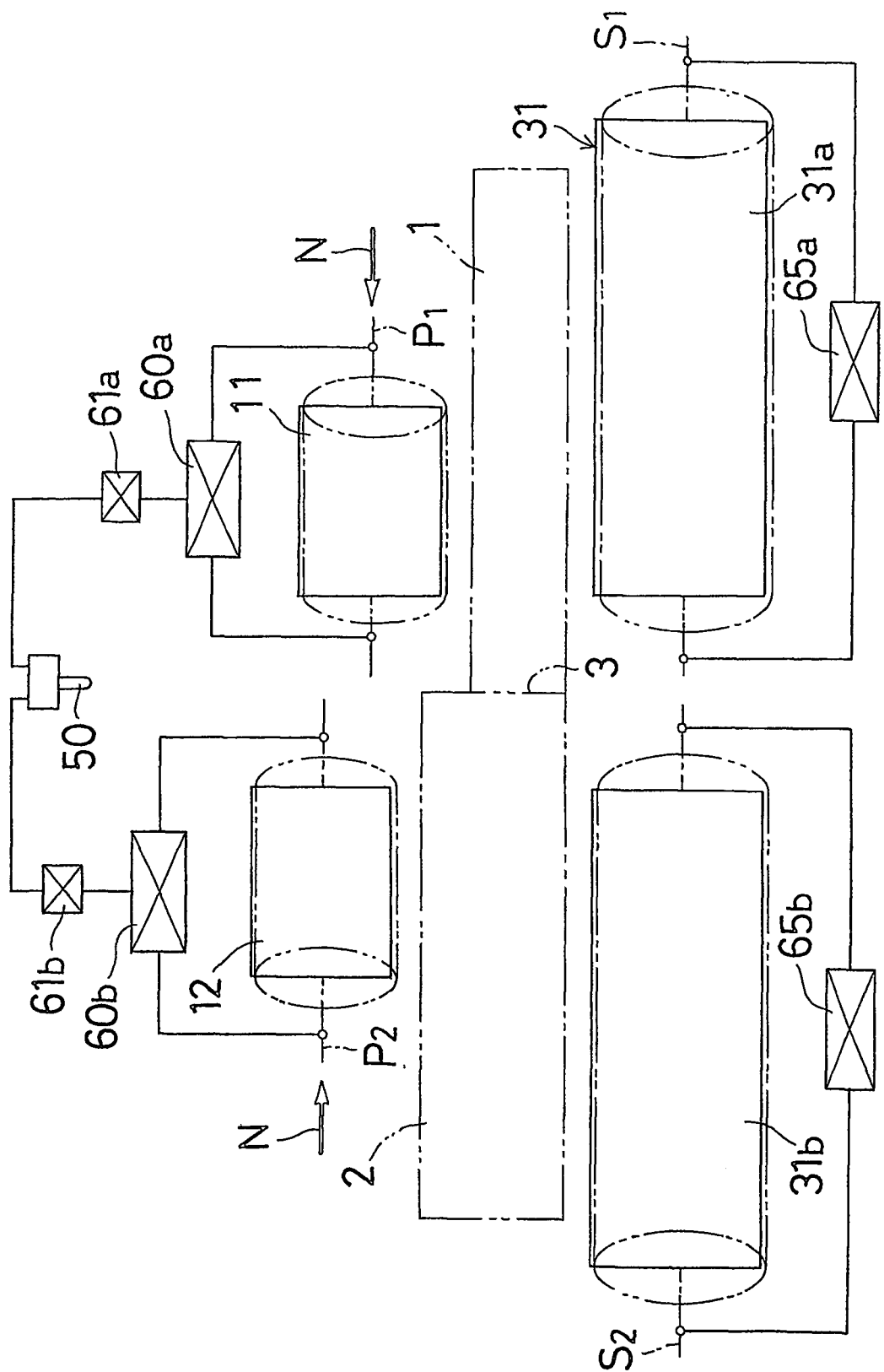
FIG. 10 is a structural view showing the forward pressing rollers and the forward supporting rollers as seen from the front side thereof for explaining one operation of these rollers.
Figure 11:
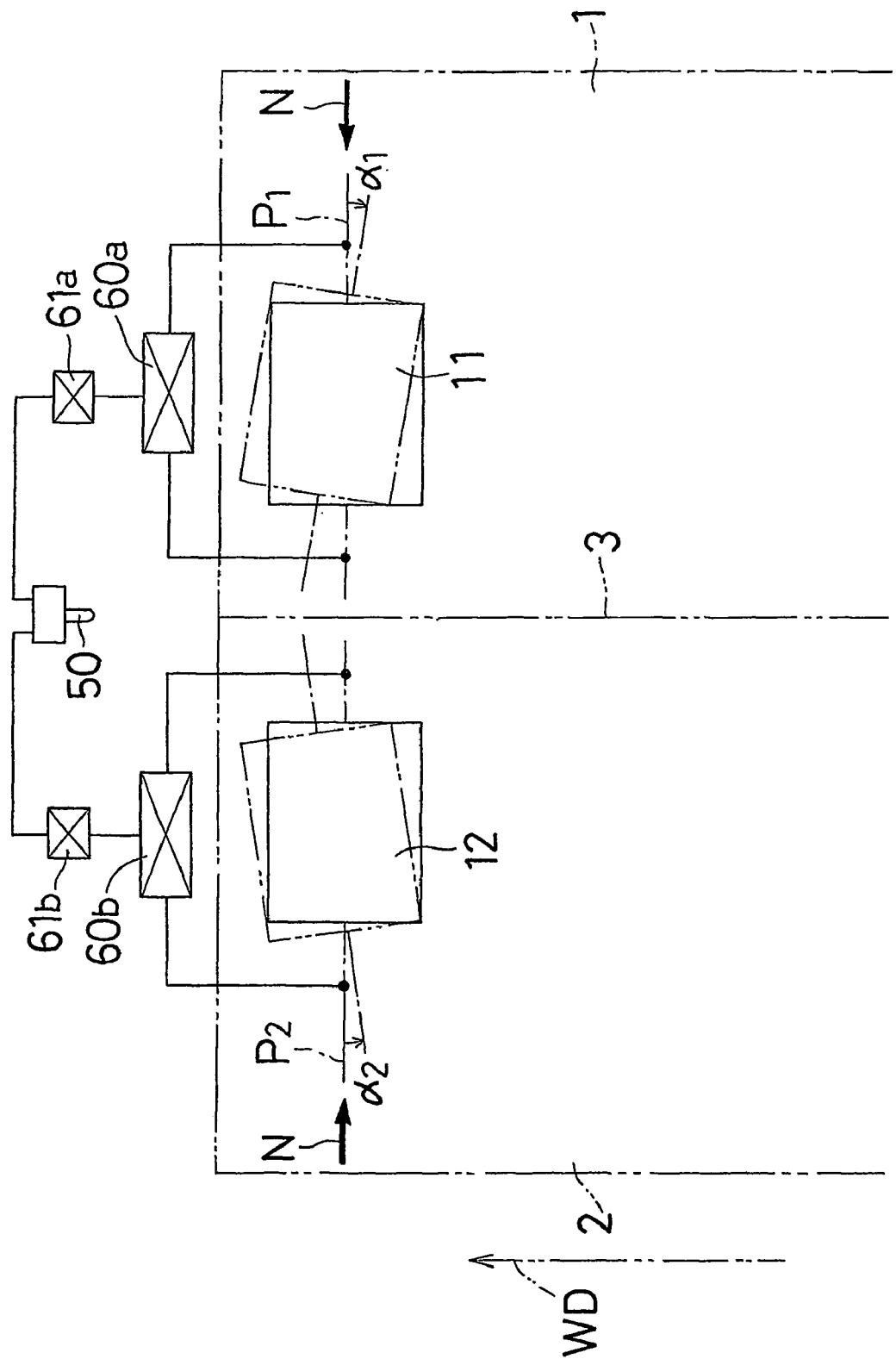
FIG. 11 is a structural view showing the forward pressing rollers as seen from the upper surface side of both the joining members for explaining one operation of these rollers.
Figure 14:
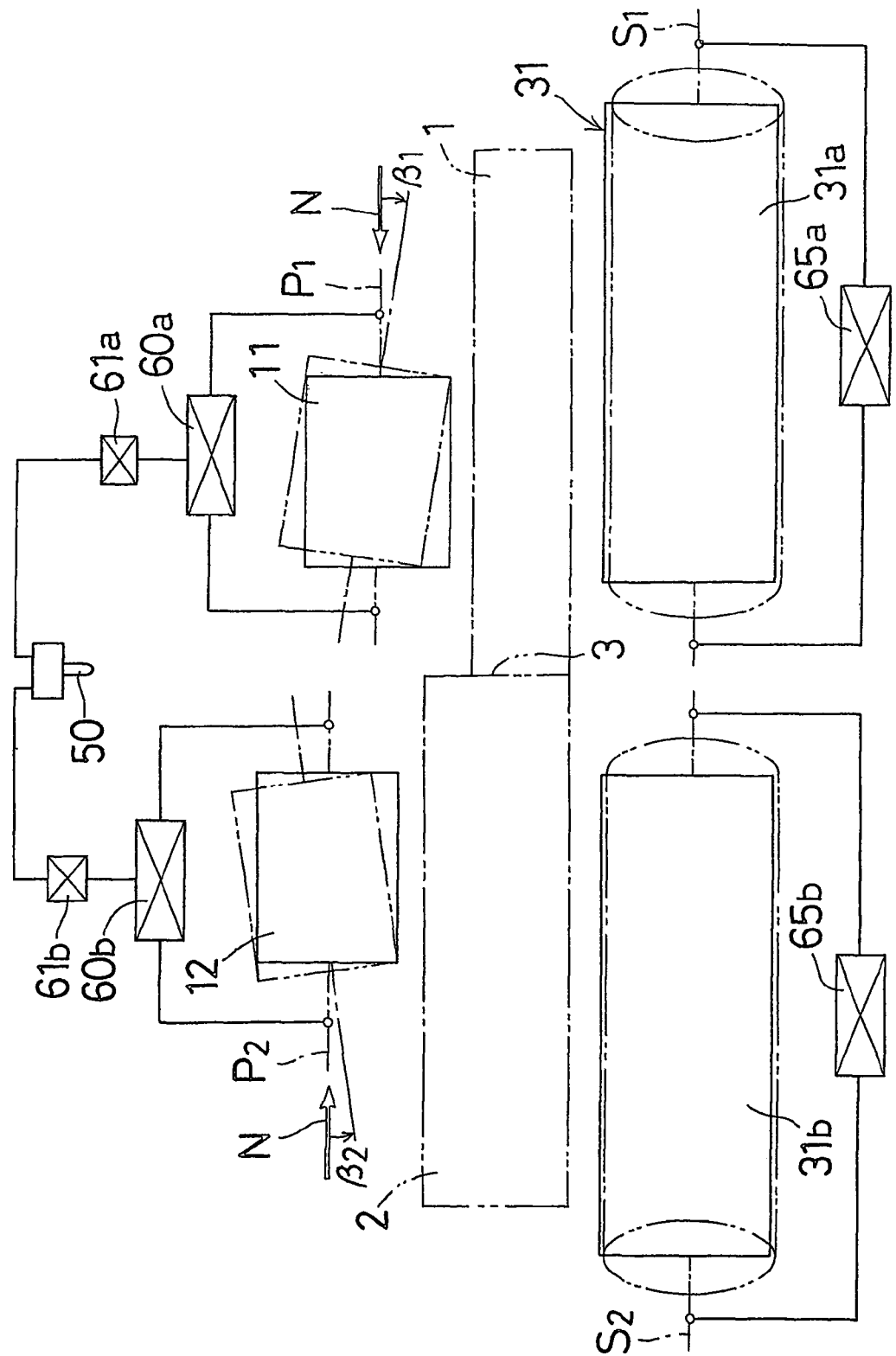
FIG. 14 is a structural view showing the forward pressing rollers and the forward supporting rollers as seen from the front side thereof for explaining the other operation of these rollers.

In FIG. 10, "60*a*" is an inclination angle changing apparatus for the first forward pressing roller 11. As shown in FIG. 11, this inclination angle changing apparatus 60*a* is for changing the inclination angle α1 of the axis P1 of the first forward pressing roller 11 within a plane parallel to the upper surface of the first joining member 1 with respect to the butting-direction N of the first joining member 1. Furthermore, as shown in FIG. 14, this inclination angle changing apparatus 60*a* also has a function for changing the inclination angle β1 of the axis P1 of the first forward pressing roller 11 within a plane perpendicular to the joining-direction WD with respect to the butting-direction N of the first joining member 1. To this inclination angle changing apparatus 60*a*, the first forward pressing roller 11 is connected. Therefore, by operating this inclination angle changing apparatus 60*a*, the inclination angle α1 and the inclination angle β1 can be changed, respectively.

In FIG. 10, "61*a*" denotes a controller for the first forward pressing roller 11. This controller 61*a* is for controlling operation of the inclination angle changing apparatus 60*a* based on the measured value obtained by the thermometry apparatus 50, as shown in FIG. 11. To this controller 61*a*, the thermometry apparatus 50 is connected. Furthermore, to this controller 61*a*, the inclination angle changing apparatus 60*a* is connected.

In FIG. 10, "60*b*" is an inclination angle changing apparatus for the second forward pressing roller 12. As shown in FIG. 11, this inclination angle changing apparatus 60*b* is for changing the inclination angle α2 of the axis P2 of the second forward pressing roller 12 within a plane parallel to the upper surface of the second joining member 2 with respect to the butting-direction N of the second joining member 2. Furthermore, as shown in FIG. 14, this inclination angle changing apparatus 60*b* also has a function for changing the inclination angle β2 of the axis P2 of the second forward pressing roller 12 within a plane perpendicular to the joining-direction WD with respect to the butting-direction N of the second joining member 2. To this inclination angle changing apparatus 60b, the second forward pressing roller 12 is connected. Therefore, by operating this inclination angle changing apparatus 60b, the inclination angle α2 and the inclination angle β2 can be changed, respectively.

In FIG. 10, "61b" denotes a controller for the second forward pressing roller 12. This controller 61b is for controlling operation of the inclination angle changing apparatus 60b based on the measured value obtained by the thermometry apparatus 50, as shown in FIG. 11. To this controller 61b, the thermometry apparatus 50 is connected. Furthermore, to this controller 61b, the inclination angle changing apparatus 60b is connected.

In this friction agitation joining apparatus 80, as shown in FIG. 9, the forward supporting roller 31 is divided into the first forward supporting roller 31a and the second forward supporting roller 31b. That is, the first forward supporting roller 31a and the second forward supporting roller 31b are separate members. The outer diameter of first forward supporting roller 31a and that of the second forward supporting roller 31b have the same dimension. By the first forward supporting roller 31a, the joining-direction forward side of the first joining member 1 relative to the probe inserted position is supported from the lower surface. Furthermore, by the second forward supporting roller 31b, the joining-direction forward side of the second joining member 2 relative to the probe inserted position is supported from the lower surface.

Figure 12:
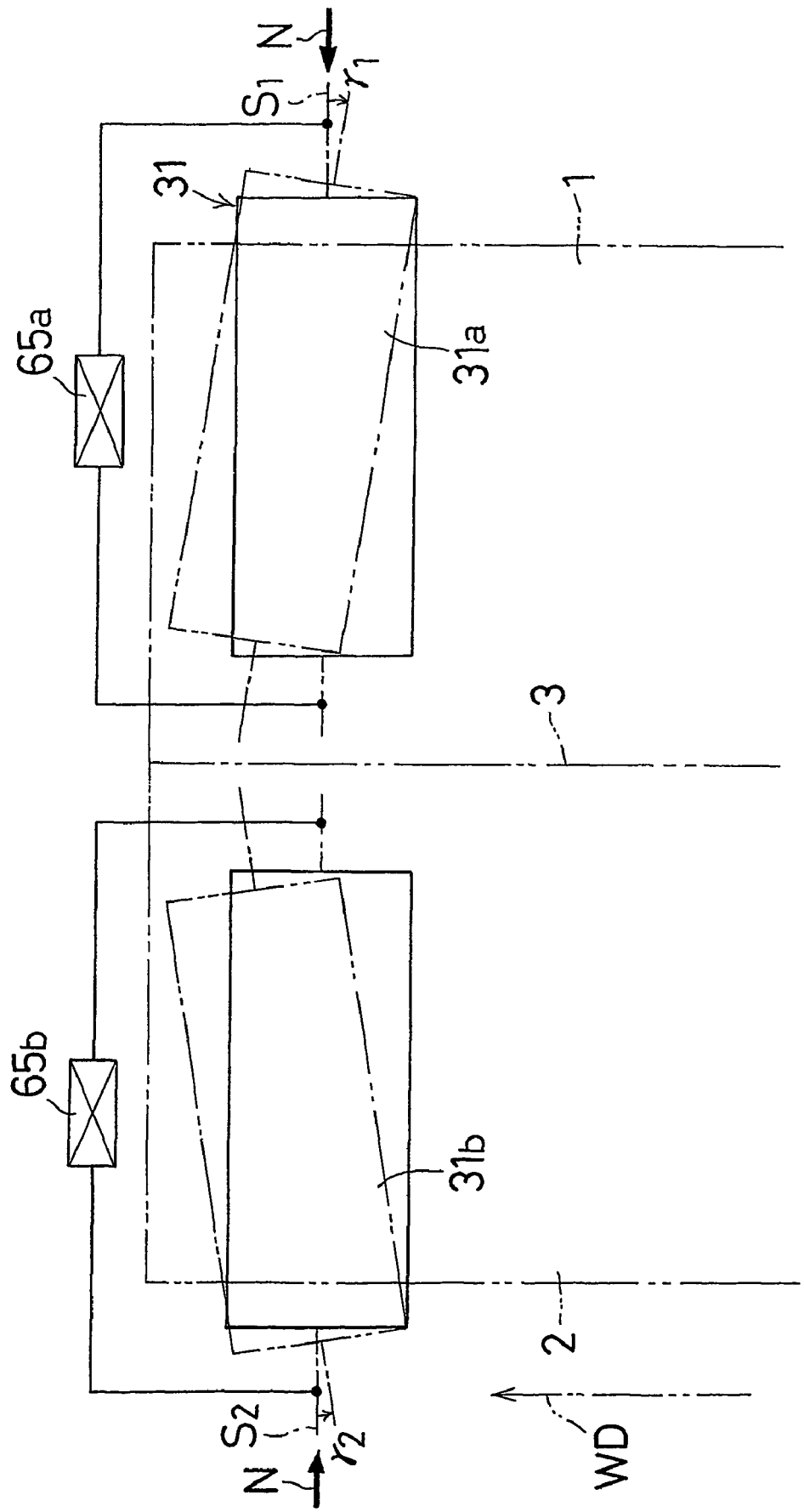
FIG. 12 is a structural view showing the forward supporting rollers as seen from the upper surface side of the joining members for explaining one operation of these rollers.

In FIG. 10, "65a" is an inclination angle changing apparatus for the first forward supporting roller 31a. As shown in FIG. 12, this inclination angle changing apparatus 65a is for changing the inclination angle γ1 of the axis S1 of the first forward supporting roller 31a within a plane parallel to the lower surface of the first joining member 1 with respect to the butting-direction N of the first joining member 1. To this inclination angle changing apparatus 65a, the first forward supporting roller 31a is connected. Therefore, by operating this inclination angle changing apparatus 65a, the inclination angle γ1 can be changed.

In FIG. 10, "65b" is an inclination angle changing apparatus for the second forward supporting roller 31b. As shown in FIG. 12, this inclination angle changing apparatus 65b is for changing the inclination angle γ2 of the axis S2 of the second forward supporting roller 31b within a plane parallel to the lower surface of the second joining member 2 with respect to the butting-direction N of the second joining member 2. To this inclination angle changing apparatus 65b, the second forward supporting roller 31b is connected. Therefore, by operating this inclination angle changing apparatus 65b, the inclination angle γ2 can be changed.

Figure 13:
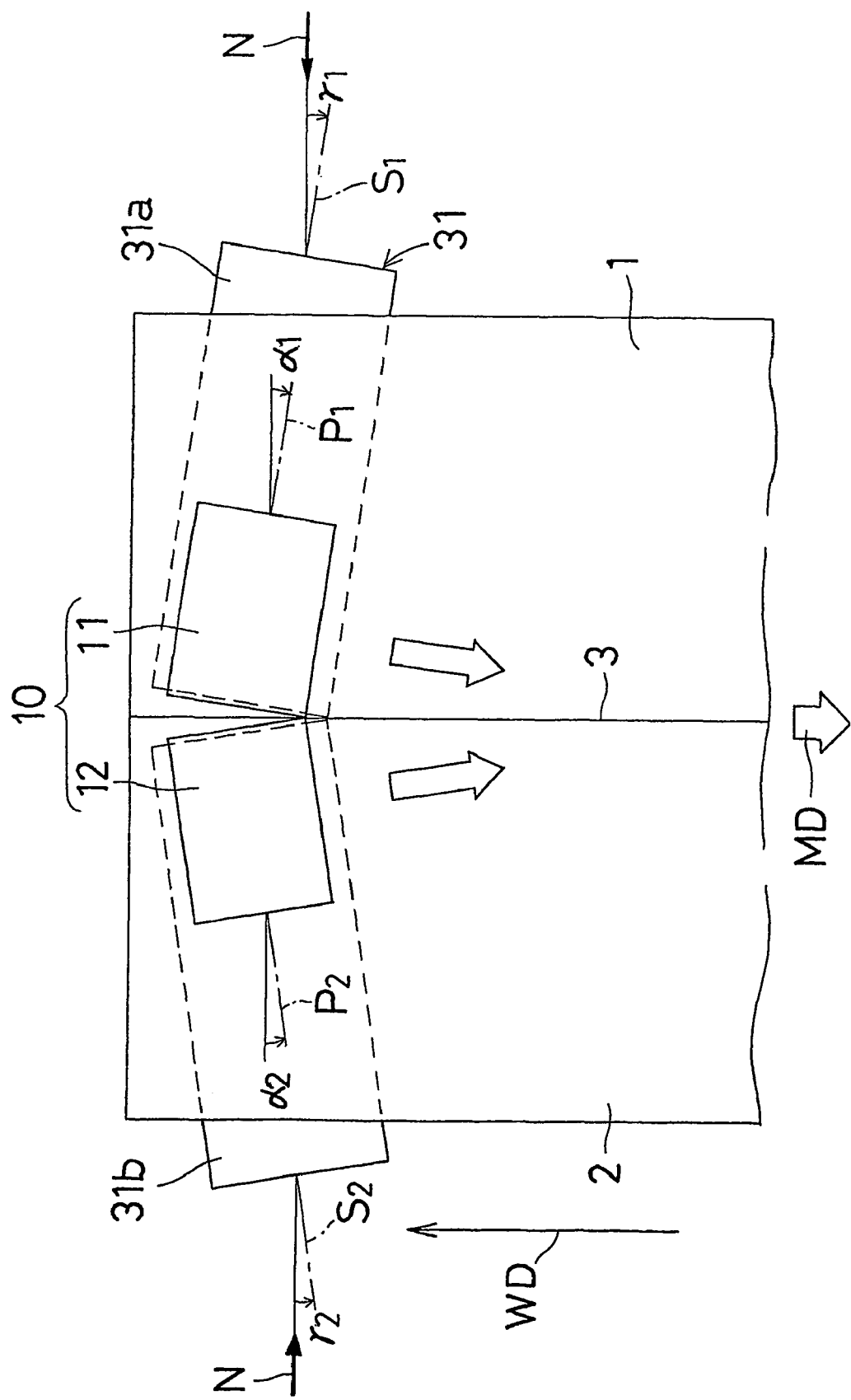
FIG. 13 is a plane view showing the joining-direction forward side of both the joining members with respect to the probe inserted position.

In this friction agitation joining apparatus 80, the first forward pressing roller 11 is arranged as shown in FIG. 13 by operating the inclination angle changing apparatus 60a as follows. That is, the first forward pressing roller 11 is arranged in a state that one end thereof at the butted portion side 3 of the first joining member 1 is positioned at a joining-direction forward position with respect to the other end thereof and that the axis P1 of this roller 11 is inclined relative to the butting-direction N of the first joining member 1 within a plane parallel to the upper surface of the first joining member 1. By arranging this first forward pressing roller 11 as mentioned above, force in the butting direction N of the first joining member 1 is given to the first joining member 1 in accordance with the movement of the first joining member 1. Furthermore, in this friction agitation joining apparatus 80, the second forward pressing roller 12 is arranged by operating the inclination angle changing apparatus 60b as follows. That is, the second forward pressing roller 12 is arranged in a state that one end thereof at the butted portion side 3 of the second joining member 2 is positioned at a joining-direction forward position with respect to the other end thereof and that the axis P2 of this roller 12 is inclined relative to the butting-direction N of the second joining member 2 within a plane parallel to the upper surface of the second joining member 2. By arranging this second forward pressing roller 12 as mentioned above, force in the butting direction N of the second joining member 2 is given to the second joining member 2 in accordance with the movement of the second joining member 2. Accordingly, in accordance with the movement of the joining members 1 and 2, both the joining members 1 and 2 come into strong contact with each other at the butted portion 3, and moves in the predetermined direction MD in the contact state.

In this friction agitation joining apparatus 80, the first forward supporting roller 31a is arranged as shown in FIG. 13 by operating the inclination angle changing apparatus 65a as follows. That is, the first forward supporting roller 31a is arranged in a state that one end thereof at the butted portion side 3 of the first joining member 1 is positioned at a joining-direction forward position with respect to the other end thereof and that the axis S1 of this roller 31 is inclined relative to the butting-direction N of the first joining member 1 within a plane parallel to the lower surface of the first joining member 1. Similarly, the second forward supporting roller 31b is arranged by operating the inclination angle changing apparatus 65b as follows. That is, the second forward supporting roller 31b is arranged in a state that one end thereof at the butted portion side 3 of the second joining member 2 is positioned at a joining-direction forward position with respect to the other end thereof and that the axis S2 of this roller 31b inclined relative to the butting-direction N of the second joining member 2 within a plane parallel to the lower surface of the second joining member 2. By arranging the first and second forward supporting rollers 31a and 31b as mentioned above, both the joining members 1 and 2 come into strong contact with each other at the butted portion 3.

Figure 15:
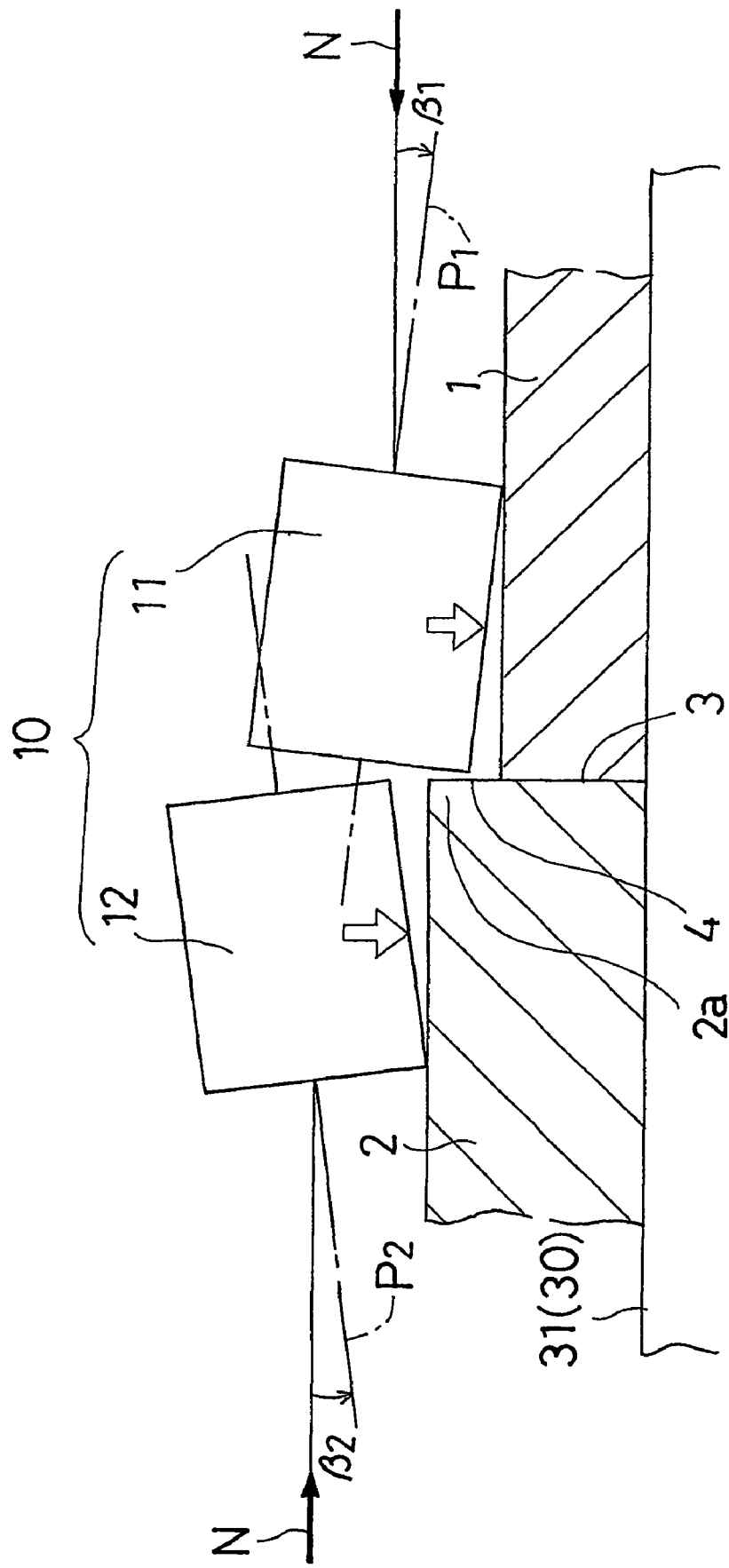
FIG. 15 is a cross-sectional view showing both the joining members for explaining the other operation of the forward pressing rollers.

In this friction agitation joining apparatus 80, the first forward pressing roller 11 is arranged as shown in FIG. 15 by operating the inclination angle changing apparatus 60a as follows. That is, the first forward pressing roller 11 is arranged in a state that one end thereof at the butted portion side 3 of the first joining member 1 is positioned upper than the other end thereof and that the axis P1 of this roller 11 is inclined relative to the butting-direction N of the first joining member 1 within a plane perpendicular to the joining direction WD. In this state, the first forward pressing roller 11 presses the first joining member 1. Similarly, the second forward pressing roller 12 is arranged by operating the inclination angle changing apparatus 60b as follows. That is, the second forward pressing roller 12 is arranged in a state that one end thereof at the butted portion side 3 of the second joining member 2 is positioned upper than the other end thereof and that the axis P2 of this roller 12 is inclined relative to the butting-direction N of the second joining member 2 within a plane perpendicular to the joining direction WD. In this state, the second forward pressing roller 12 presses the second joining member 2.

Figure 16:
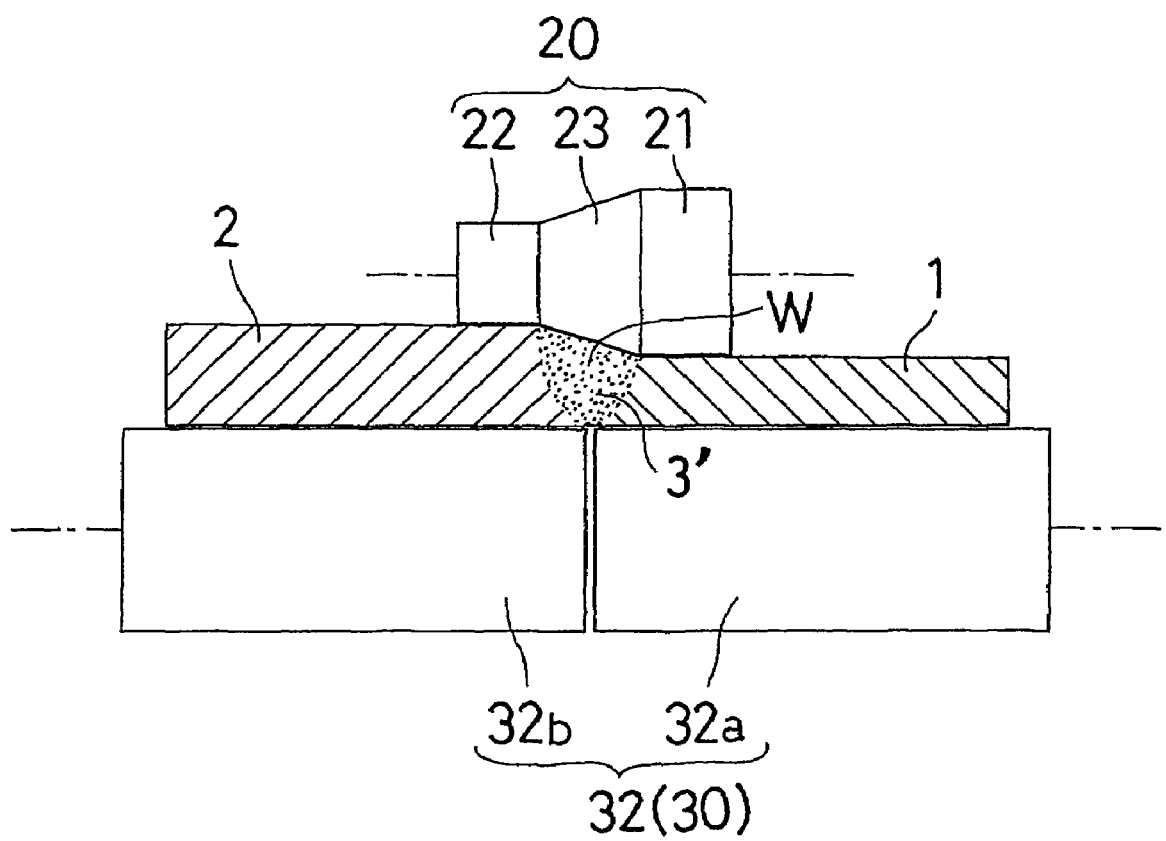
FIG. 16 is a cross-sectional view taken along the line E—E in FIG. 9.

As shown in FIG. 16, in this friction agitation joining apparatus, the backward supporting roller 32 is divided into the first backward supporting roller 32a and the second backward supporting roller 32*b*. The outer diameter of the first backward supporting roller 32*a* and that of the second backward supporting roller 32*b* have the same dimension. The joining-direction backward side of the first joining member 1 with respect to the probe inserted position is supported by the first backward supporting roller 32*a* from the lower surface side thereof, while the joining-direction backward side of the second joining member 2 with respect to the probe inserted position is supported by the second backward supporting roller 32*b* from the lower surface side thereof.

In this second embodiment, the joining operation is performed as follows. The butted portion 3 is joined with the probe 42 by moving both the joining members 1 and 2 in the predetermined direction MD while measuring the surface temperature of the joined butted portion 3' of the joining members 1 and 2.

In cases where the surface temperature of the joined butted portion 3' is higher than or lower than the predetermined temperature, poor junction such as joining defect and thermal distortion generate easily. Therefore, if it is discriminated that the surface temperature of the joined butted portion 3' is higher than or lower than the predetermined temperature during the joining, at least one of the inclination angle changing apparatuses 60*a* and 60*b* is operated via the controller 61*a* and 61*b* based on the measured value obtained the thermometry apparatus 50 in order to change at least one of the inclination angles $\beta 1$ or $\beta 2$. Thereby, the press force from the roller to be received by the joining members 1 and 2 changes in the butting direction N. As a result, generation of poor junction can be prevented assuredly. This changing operation of the inclination angle $\beta 1$ and $\beta 2$ is performed automatically. Thus, in this second embodiment, joining can be performed while preventing generation of poor junction, and therefore poor joining prevention work can be performed efficiently.

Furthermore, in this second embodiment, since the butted portion 3 is joined with both joining members 1 and 2 firmly adhered, a firmly joined butted portion 3' can be obtained. Also, the fault that the butted portion 3 detaches during the movement of the joining members 1 and 2 can be prevented.

Furthermore, since the forward pressing roller 10 is divided into the first forward pressing roller 11 and the second forward pressing roller 12, each joining member 1 and 2 can be pressed firmly even if the thickness of each joining member 1 and 2 fluctuates in the longitudinal direction.

Furthermore, since the backward supporting roller 32 is divided into the first backward supporting roller 32*a* and the second backward supporting roller 32*b*, the design freedom degree of the backward supporting roller 32 can be increased. Accordingly, the meandering movement of the joining members 1 and 2 can be prevented by changing the mutual position of the first backward supporting roller 32*a* and the second backward supporting roller 32*b* or changing the circumferential speed thereof. Furthermore, straightening effect to the configuration defect of each joining member 1 and 2 can be increased.

In this second embodiment, as a characteristic regarding the joining state of the joined butted portion 3', the surface temperature of the butted portion 3' is exemplified. However, in the present invention, the characteristic regarding the joining state may be, for example, the surface residual stress of the butted portion 3'.

However, the present invention is not limited to those represented by the aforementioned first and second embodiments, and allow various settings.

For example, the backward pressing roller 20 may be divided into a first backward pressing roller 21, a second backward pressing roller 22 and a third backward pressing roller 23.

Furthermore, the forward pressing roller 10 and/or the backward pressing roller 20 may be constituted such that they function as a driving roller for moving the joining members 1 and 2 in the predetermined direction MD or they are provided with circumferential-speed controlling mechanism.

Furthermore, in the friction agitation joining method according to the present invention, the butted portion 3 may be joined by moving the rotating probe 42 inserted into the butted portion 3 of the joining members 1 and 2 along the butted portion 3 in a state in which the position of the joining members 1 and 2 is fixed. In this case, the moving direction of the probe coincides with the joining direction.

Third Embodiment

FIGS. 17 to 21 are drawings for explaining a friction agitation joining method, a method for manufacturing of butted joining members and a friction agitation joining method according to the third embodiment of the present invention. In these figures, the same reference numeral is allotted to the same component as in the aforementioned first embodiment. Hereinafter, this third embodiment will be explained by focusing on the differences between the first embodiment and the third embodiment.

Figure 17:
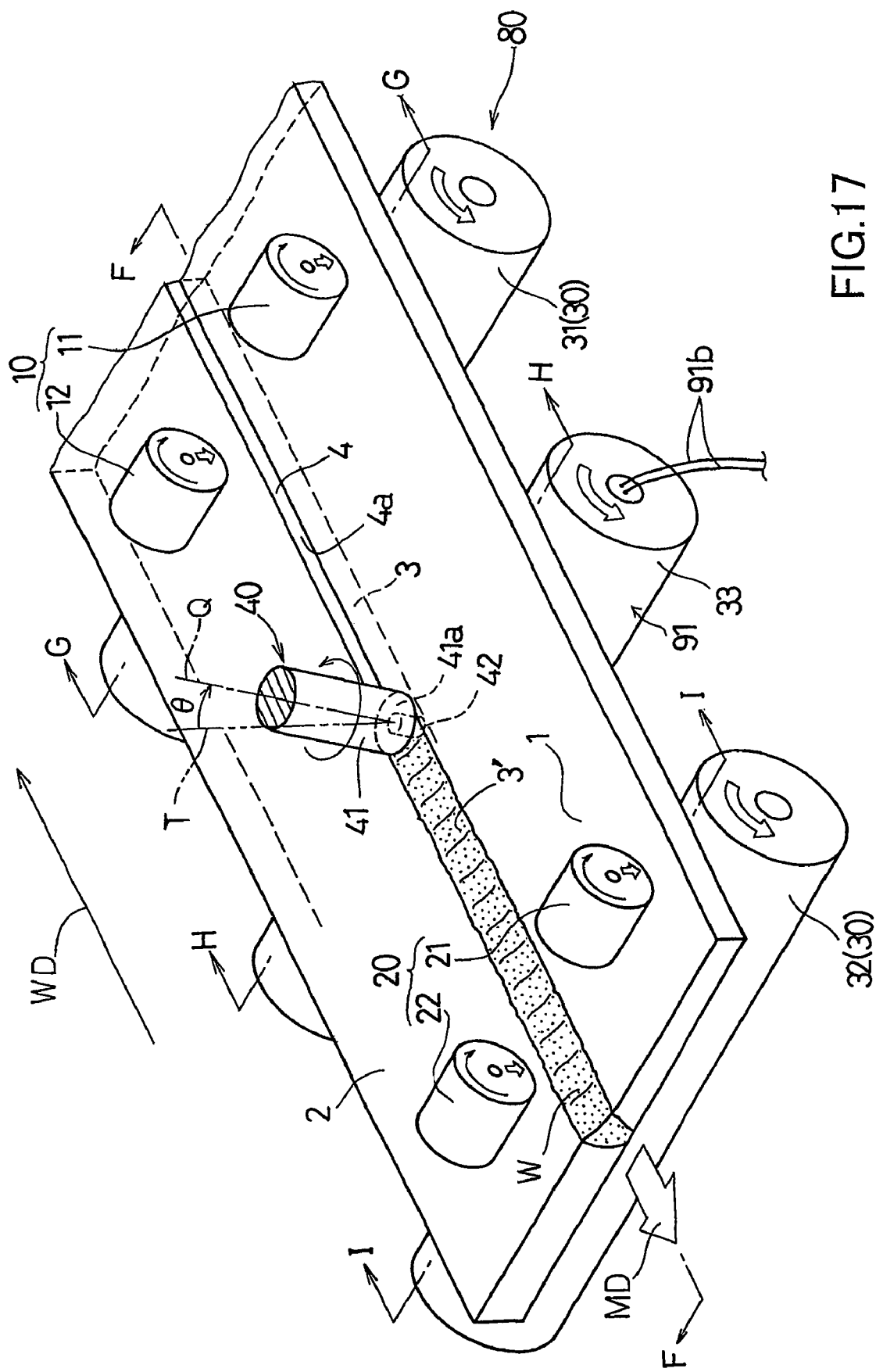
FIG. 17 is a perspective view corresponding to FIG. 2 showing the state in the middle of joining the butted portion of both the joining members by the friction agitation joining method according to the third embodiment of the present invention.
Figure 18:
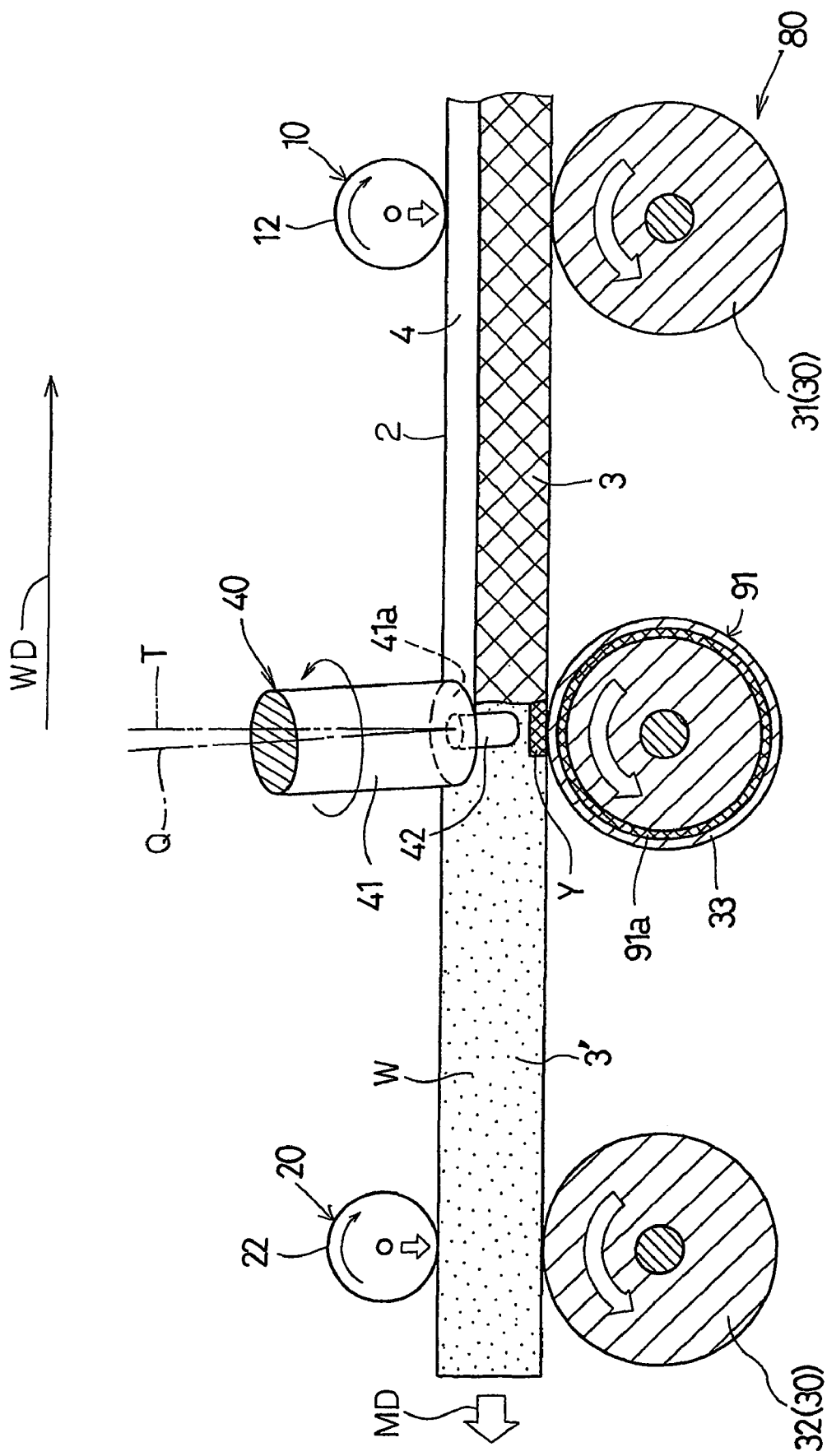
FIG. 18 is a cross-sectional view taken along the line F—F in FIG. 17.
Figure 19:
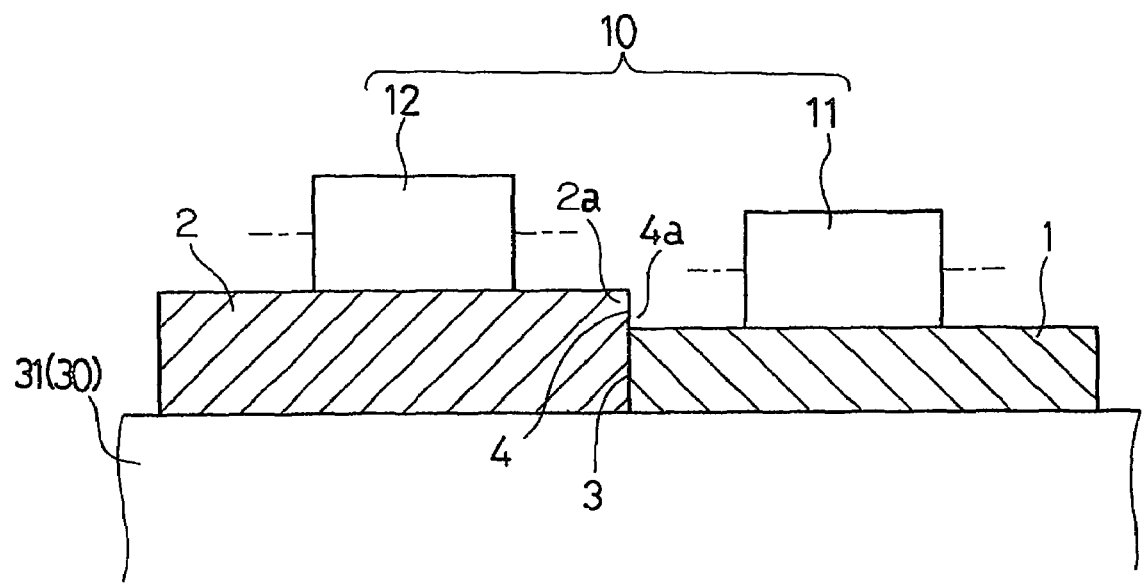
FIG. 19 is a cross-sectional view taken along the line G—G in FIG. 17.

In this third embodiment, the friction agitation joining apparatus 80 is equipped with a heating roller 91 as a heating device. This heating roller 91 is constituted by a backing roller 33 having the following structure. The structure of the backing roller 33 will be explained as follows. As shown in FIG. 18, at the peripheral surface portion of the longitudinal intermediate portion of the backing roller 33, an electric heater 91*a* as heating source is embedded along the entire circumference thereof. As shown in FIG. 17, the electric power supplying cord 91*b* for supplying electric power to the electric heater 91*a* is connected to the electric heater 91*a*. This backing roller 33 is made of heat-resisting materials that can withstand heat generated by the electric heater 91*a*. By supplying electric power to this electric heater 91*a* to generate heat, the periphery of the backing roller 33 is heated.

In this third embodiment, the forward pressing roller 10 is divided into the first forward pressing roller 11 and the second forward pressing roller 12 in the same manner as in the second embodiment, as shown in FIG. 17. That is, the first forward pressing roller 11 and the second forward pressing roller 12 are members separated each other. The outer diameter of the first forward pressing roller 11 and that of the second forward pressing roller 12 are set to have the same dimension.

Furthermore, as shown in FIG. 17, the backward pressing roller 20 is not equipped with a third backward pressing roller, and divided into the first backward pressing roller 21 and the second backward pressing roller 22. That is, the first backward pressing roller 21 and the backward pressing roller 22 are members separated from each other. The outer diameter of the first backward pressing roller 21 and that of the second backward pressing roller 22 are set to have the same dimension.

Figure 20:
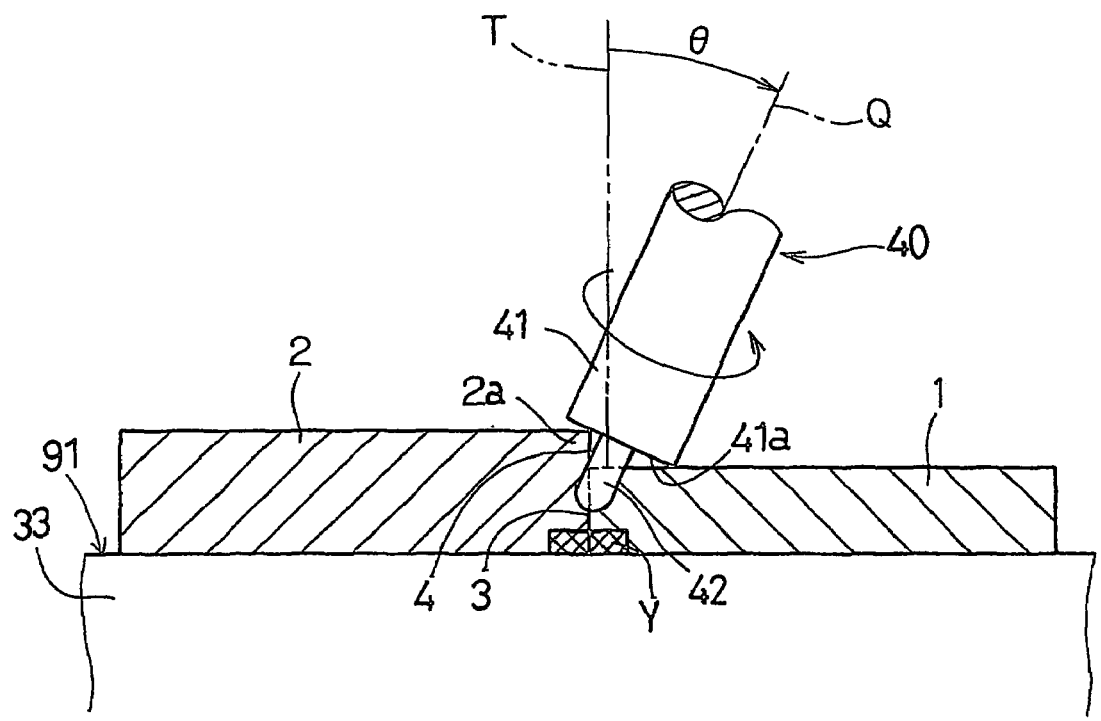
FIG. 20 is a cross-sectional view taken along the line H—H in FIG. 17.

In this third embodiment, the joining operation is performed as follows. That is, in advance, the periphery of backing roller 33 is heated by the electric heater 91*a*. Then, during the joining, the lower surface of the joining members 1 and 2 is heated by bringing the heated periphery of the backing roller 33 into contact with the lower surface of the butted portion 3 of the joining members 1 and 2 at the probe inserted position. As a result, the heat of the periphery of the backing roller 33 is conducted to the lower surface of joining members 1 and 2, and then the conducted heat is conducted from the lower surface in the thickness direction. Thereby, the portion near the lower surface in the thickness direction of the joining members 1 and 2 becomes high temperature state. In FIGS. 18 and 20, "Y" denotes a portion of the joining members 1 and 2 in a high temperature state. In the present invention, it is preferable to heat the lower surface so that the temperature of the lower surface of the joining members 1 and 2 falls within the range of from 400° to 500° because of the following reasons. If the temperature of the lower surface is less than 400° C., there is a possibility that the mixing of materials cannot be performed well due to insufficient heating. On the other hand, if it exceeds 500° C., there is a possibility that the joining members 1 and 2 may be melt due to overheating.

In a state in which the heated periphery of the backing roller 33 contacts the lower surface of the joining members 1 and 2, both joining members 1 and 2 are moved in a predetermined direction MD. As a result, in accordance with the movement of the joining member 1 and 2, the butted portion 3 is joined by the probe 42 at the probe inserted position.

Figure 21:
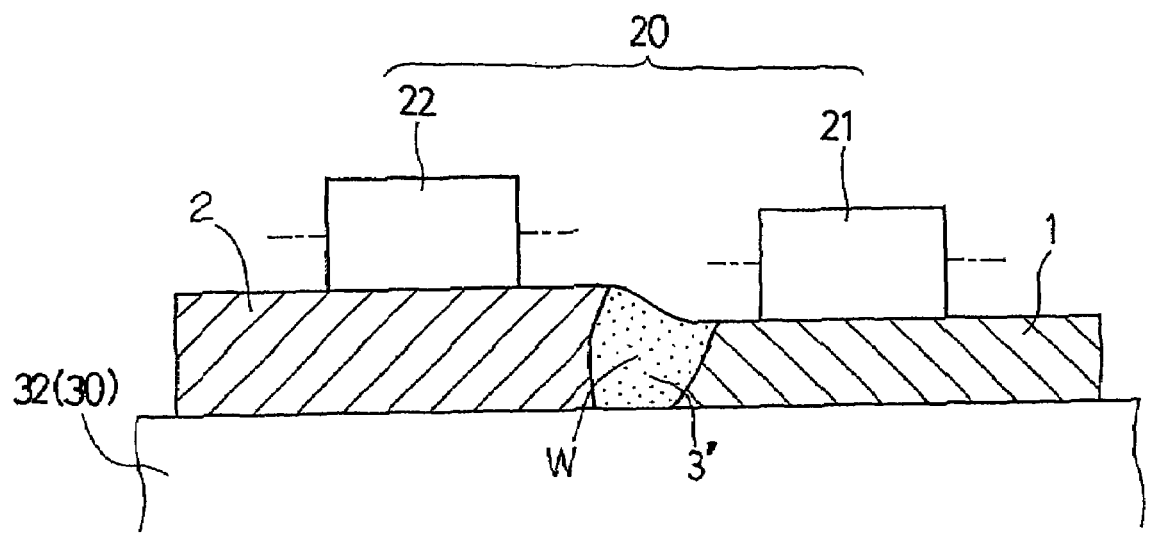
FIG. 21 is a cross-sectional view taken along the line I—I in FIG. 17.

In this third embodiment, since the lower surface of the probe inserted position of the butted portion 3 of the joining members 1 and 2 is contacted by the heated backing roller 33 and therefore heated, the portion near the lower surface in the thickness direction of the joining members 1 and 2 is in a high temperature state. Accordingly, the materials between the tip of the probe 42 and the lower surfaces of the joining members 1 and 2 can be softened very quickly, resulting in sufficient mixing of the materials. Accordingly, the generating of the root remaining portion R (see FIG. 31) can be prevented, and as shown in FIG. 21, the butted portion 3 can be joined along the entire thickness length. Accordingly, according to this friction agitation joining method, even if the thickness dimension of the joining member 1 and 2 fluctuates in the longitudinal direction, the generation of the root remaining portion can be prevented assuredly, resulting in improved joining strength.

Furthermore, in this friction agitation joining method, since the joining is performed while heating the lower surface of the probe inserted position of the butted portion 3 of the joining members 1 and 2 by the periphery of the backing roller 33, the joining operation can be performed well and the heating can be performed efficiently.

In the present invention, the joining may be performed while heating the lower surface of the joining-direction forward side of the probe inserted position of the joining members 1 and 2 by bringing the heated periphery of the heating roller 91 into contact with the lower surface.

Fourth Embodiment

Figure 22:
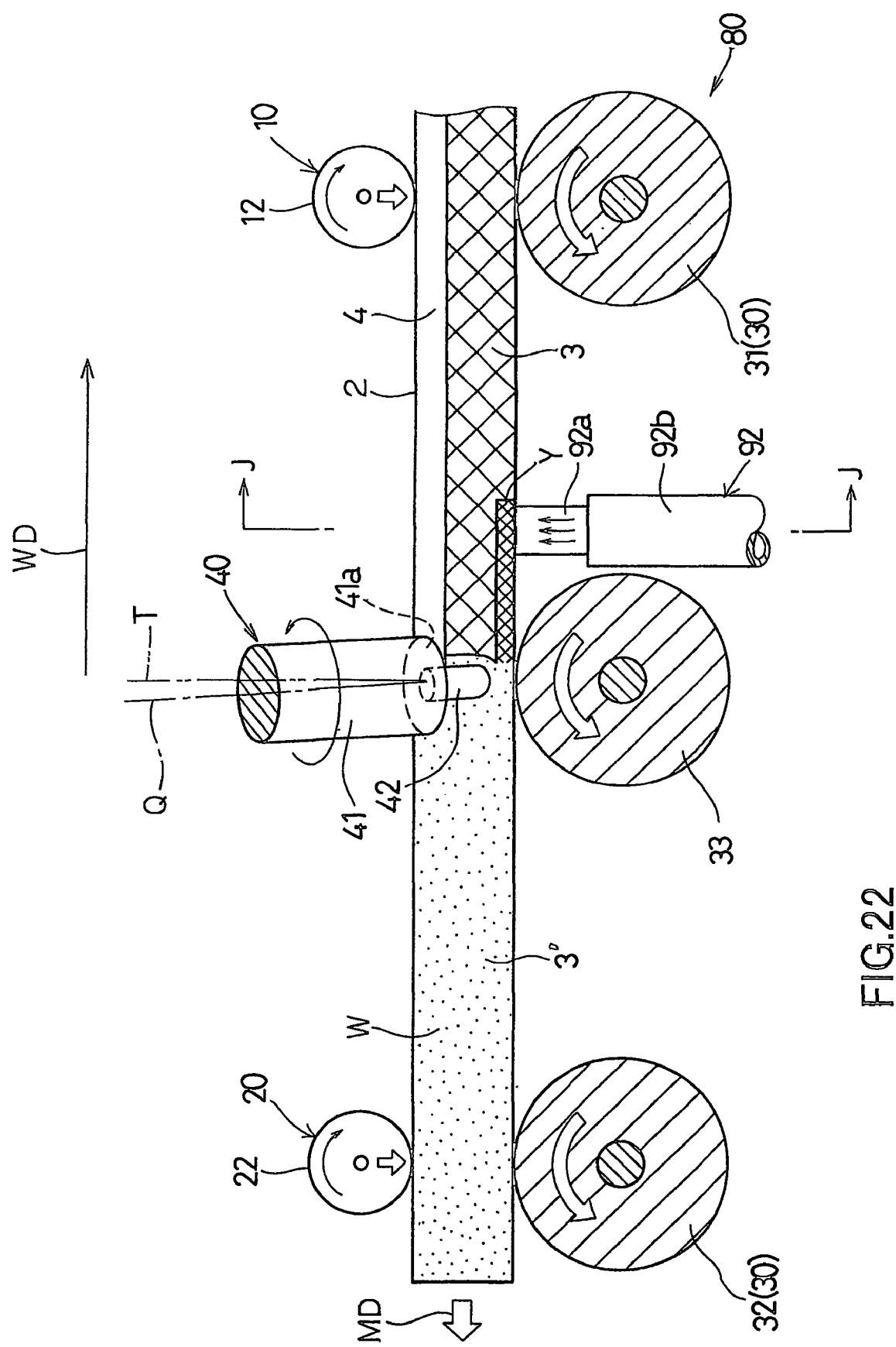
FIG. 22 is a cross-sectional view corresponding to FIG. 18 showing the friction agitation joining method according to the fourth embodiment of the present invention.
Figure 23:
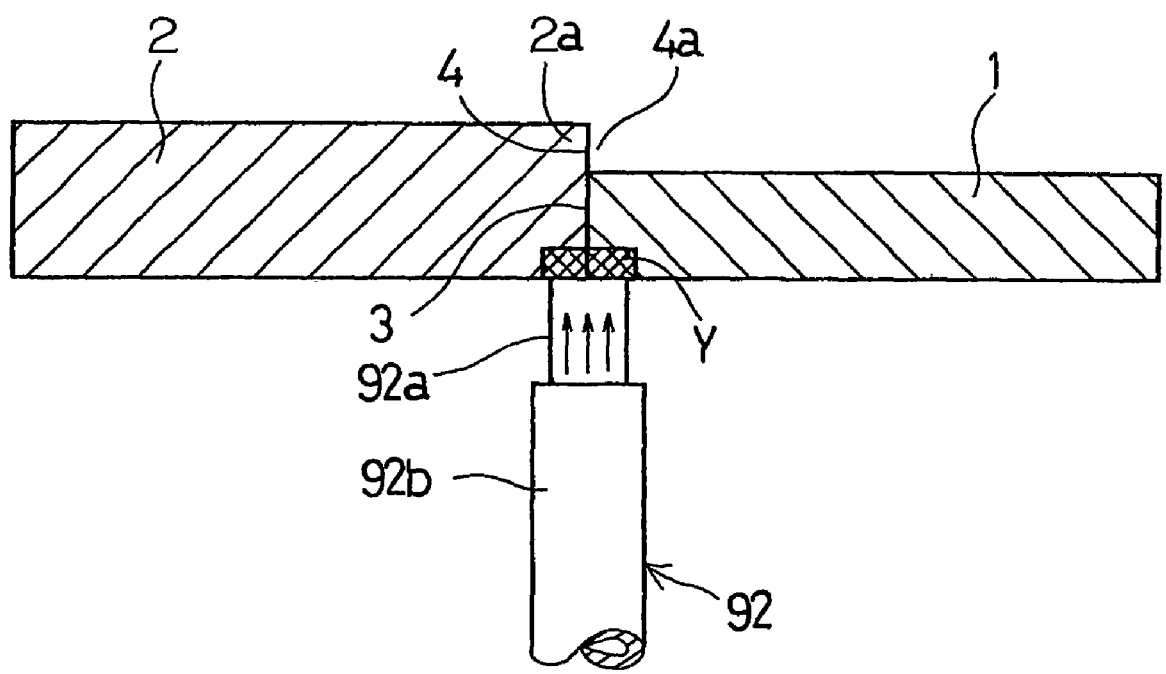
FIG. 23 is a cross-sectional view taken along the line J—J in FIG. 22.

FIGS. 22 and 23 are drawings for explaining a friction agitation joining method, a method for manufacturing of butted joining members and a friction agitation joining method according to the fourth embodiment of the present invention. In these figures, the same reference numeral is allotted to the same component as in the aforementioned first embodiment. Hereinafter, this fourth embodiment will be explained by focusing on the differences between the third embodiment and the fourth embodiment.

In this fourth embodiment, the friction agitation joining apparatus 80 is equipped with a laser irradiation heating apparatus 92 as a heating apparatus. As shown in FIG. 22, this laser irradiation heating apparatus 92 is disposed at the lower surface side of the portion near the probe inserted position of the joining-direction forward side of the joining members 1 and 2. On the other hand, the backing roller 33 has no built-in electric heater.

This laser irradiation heating apparatus 92 is equipped with a nozzle 92b for injecting a laser 92a. This nozzle 92b is disposed with the injection tip facing up.

In this fourth embodiment, a laser 92a is injected from the injection tip of the nozzle 92b at the time of joining, and this laser 92a irradiates the lower surface of the butted portion 3 of the joining members 1 and 2 at the joining-direction forward side of the probe inserted position to heat the lower surface. Then, the heat conducts in the thickness direction from the lower surface. Thereby, the portion near the lower surface of joining members 1 and 2 will become high in temperature ("Y" denotes the portion).

While irradiating the laser 92a at the lower surface of joining members 1 and 2, the joining members 1 and 2 are moved in the predetermined direction MD. In accordance with the movement of the joining members 1 and 2, the butted portion 3 is joined by the probe 42 at the probe inserted position.

In this fourth embodiment, when the high temperature portion Y of the joining members 1 and 2 reaches the probe inserted position in accordance with the movement of the joining members 1 and 2, the materials between the tip of the probe 42 and the lower surfaces of the joining members 1 and 2 softens very quickly, resulting in sufficient mixture of the materials. Accordingly, the generation of the root remaining portion R (see FIG. 31) can be prevented.

In the present invention, in cases where there are no obstruction such as a backing roller 33 at the lower surface side of the butted portion 3 of the joining members 1 and 2 at the probe inserted position, the joining may be performed while heating the lower surface of the probe inserted position of the joining members 1 and 2 at the butted portion 3 by irradiating the laser 92a.

Fifth Embodiment

Figure 24:
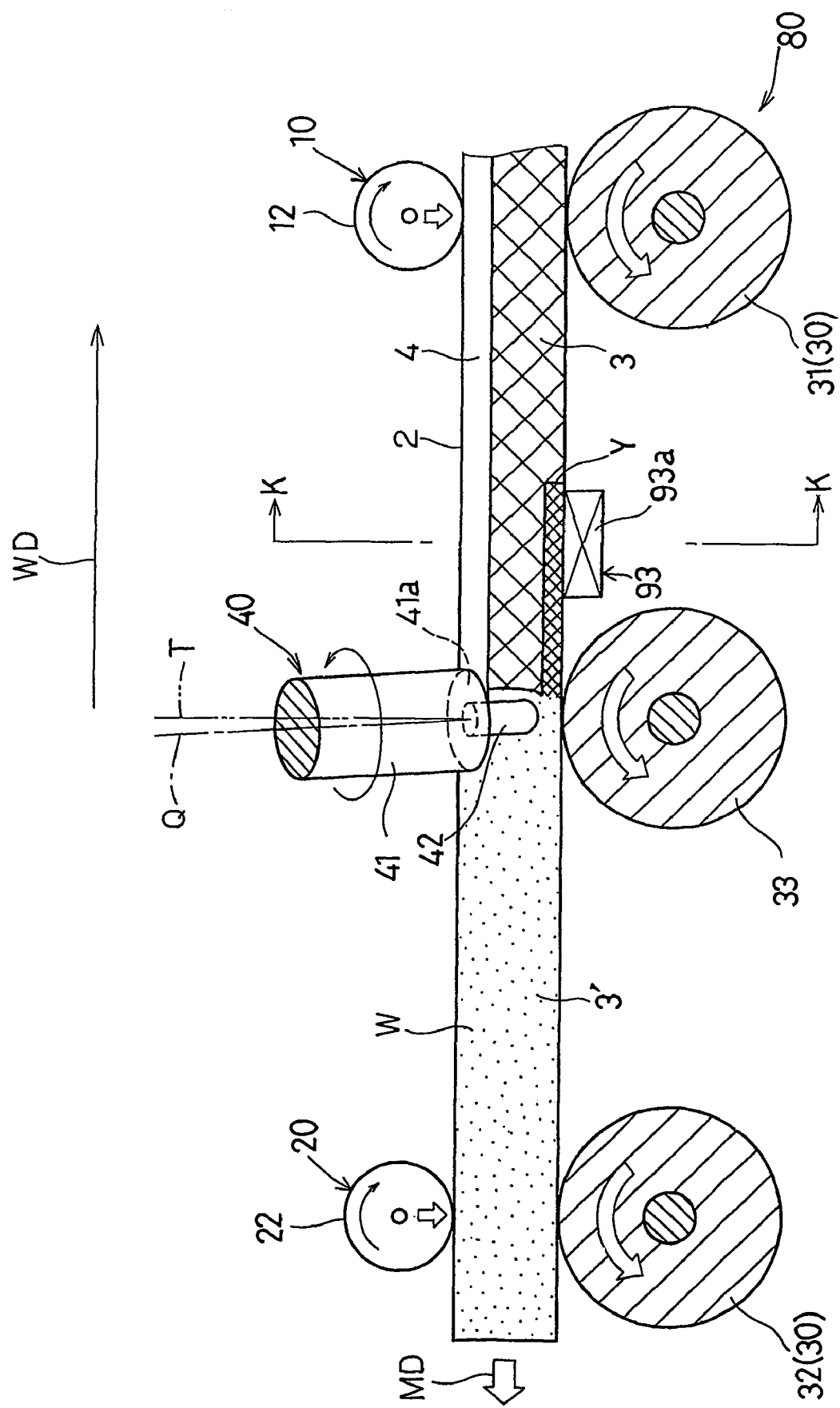
FIG. 24 is a cross-sectional view corresponding to FIG. 18 showing the friction agitation joining method according to the fifth embodiment of the present invention.
Figure 25:
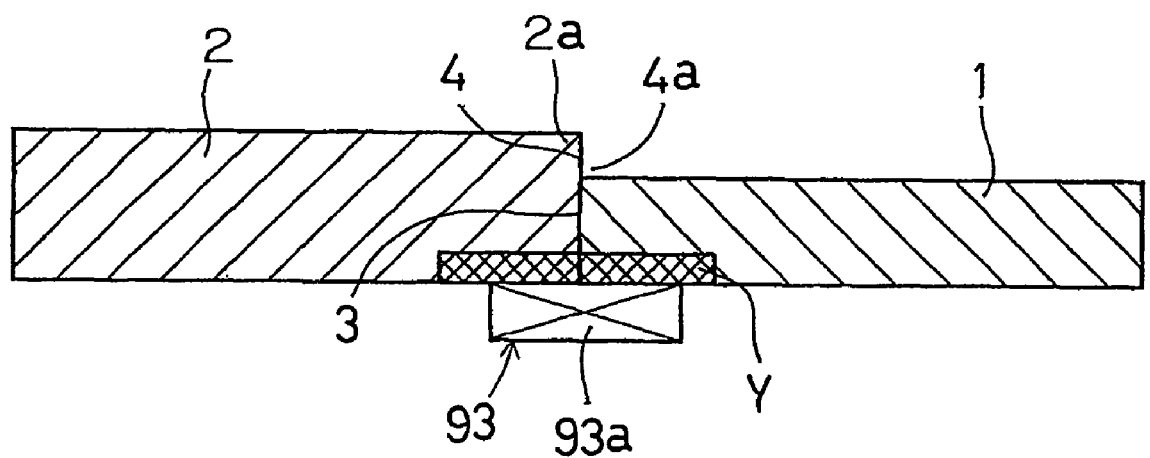
FIG. 25 is a cross-sectional view taken along the line K—K in FIG. 24.

FIGS. 24 and 25 are drawings for explaining a friction agitation joining method, a method for manufacturing of butted joining members and a friction agitation joining method according to the fifth embodiment of the present invention. In these figures, the same reference numeral is allotted to the same component as in the aforementioned first embodiment. Hereinafter, this fifth embodiment will be explained by focusing on the differences between the third embodiment and the fifth embodiment.

In the fifth embodiment, the friction agitation joining apparatus 80 is equipped with a high frequency induction heating apparatus 93 as a heating apparatus. This high frequency induction heating apparatus 93 is disposed at the lower surface side of the portion near the probe inserted position of the joining-direction forward side of the joining members 1 and 2. On the other hand, the backing roller 33 has no built-in electric heater.

This high frequency induction heating apparatus 93 is equipped with an induction coil 93a. To this induction coil 93a, a high frequency power source (not shown) is connected. As shown in FIG. 25, this induction coil 93a is disposed at the lower surface of the joining members 1 and 2 in contact with the lower surface or near the lower surface so as to bridge the butted portion 3.

In this fifth embodiment, a high frequency current is made to pass through the induction coil 93a at the time of joining to thereby generate an induced current at the lower surface of the joining members 1 and 2. Thereby, the lower surface is heated.

While generating an induced current at the lower surface of joining members 1 and 2, the joining members 1 and 2 are moved in the predetermined direction MD. In accordance with the movement of the joining members 1 and 2, the butted portion 3 is joined by the probe 42 at the probe inserted position.

In this fifth embodiment, when the high temperature portion Y of the joining members 1 and 2 reaches the probe inserted position in accordance with the movement of the joining members 1 and 2, the materials between the tip of the probe 42 and the lower surfaces of the joining members 1 and 2 softens very quickly, resulting in sufficient mixture of the materials. Accordingly, the generation of the root remaining portion R (see FIG. 31) can be prevented.

In the present invention, in cases where there are no obstruction such as a backing roller 33 at the lower surface side of the butted portion 3 of the joining members 1 and 2 at the probe inserted position, the joining may be performed while heating the lower surface of the probe inserted position of the joining members 1 and 2 at the butted portion 3 by disposing an induction coil 93a at the lower surface at the probe inserted position to thereby generate an induced current in the lower surface.

Sixth Embodiment

Figure 26:
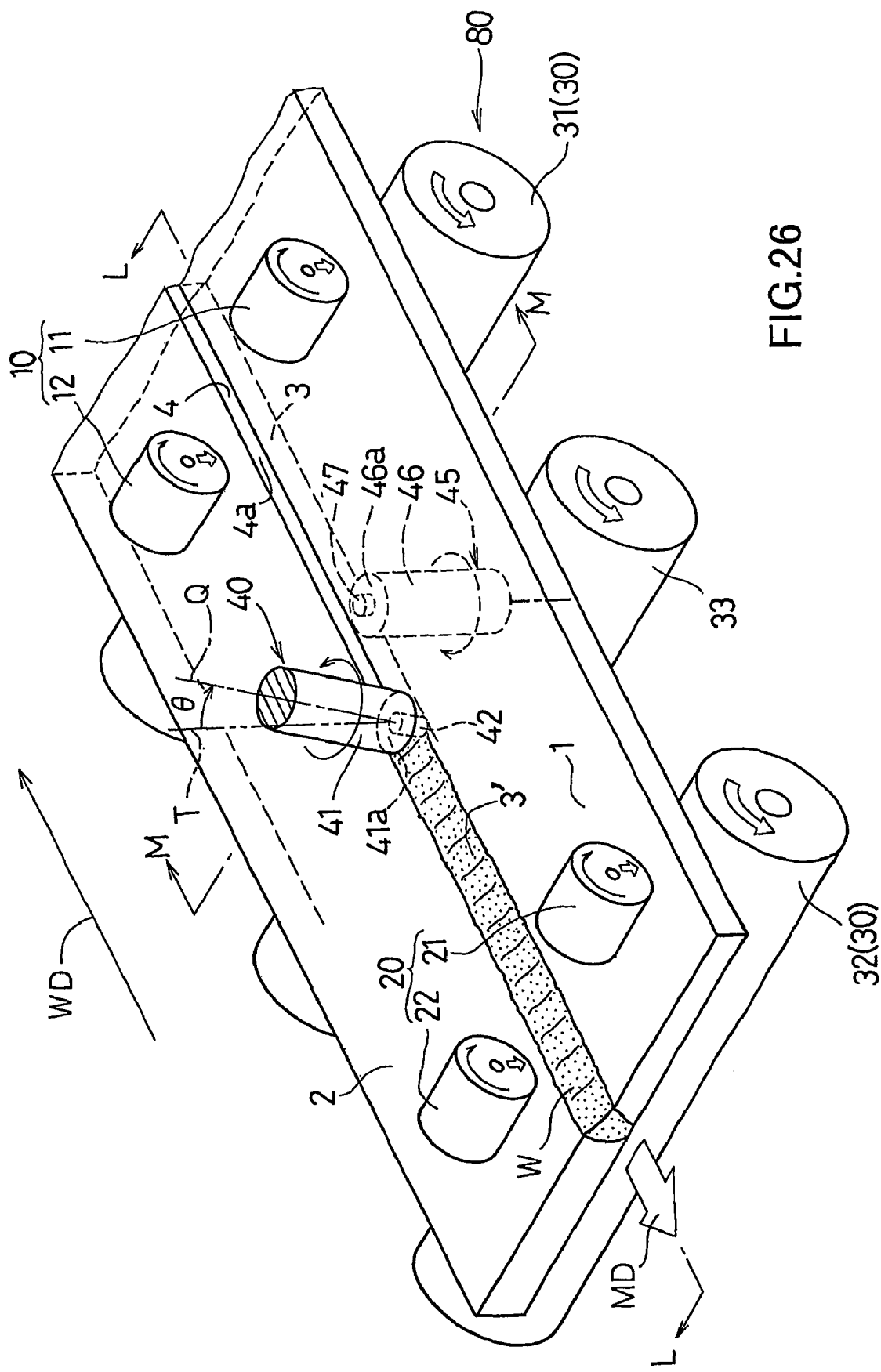
FIG. 26 is a perspective view corresponding to FIG. 17 showing the friction agitation joining method according to the sixth embodiment of the present invention.
Figure 27:
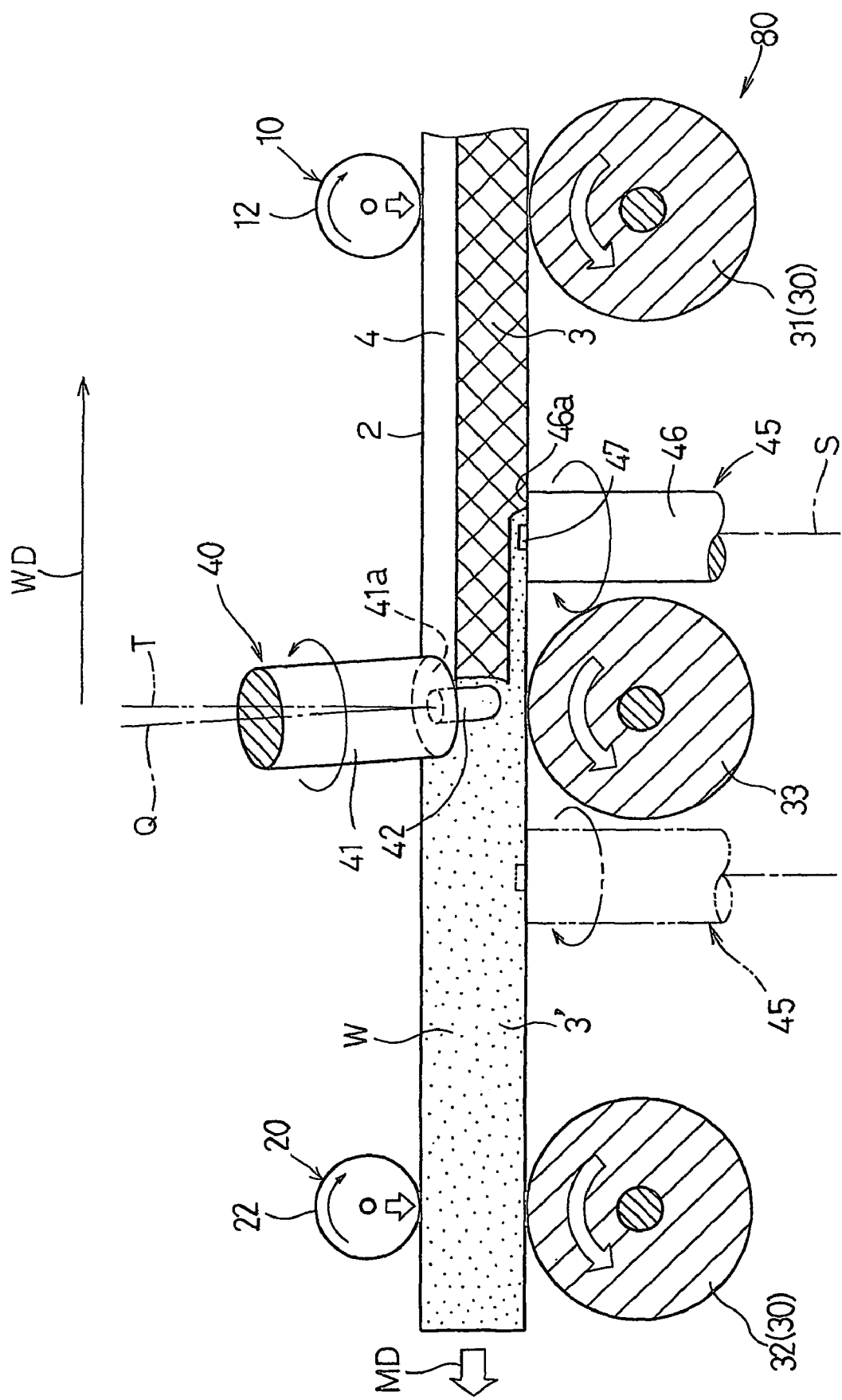
FIG. 27 is a cross-sectional view taken along the line L—L in FIG. 26.
Figure 28:
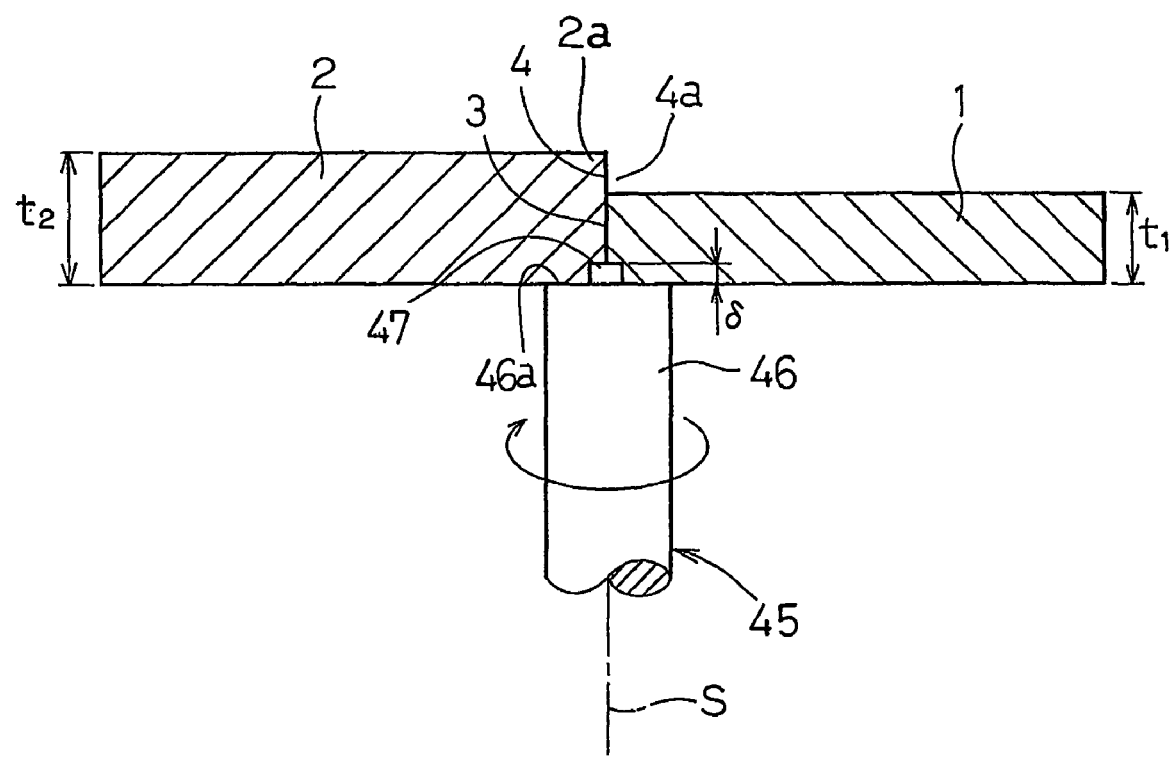
FIG. 28 is a cross-sectional view taken along the line M—M in FIG. 26.
Figure 29:
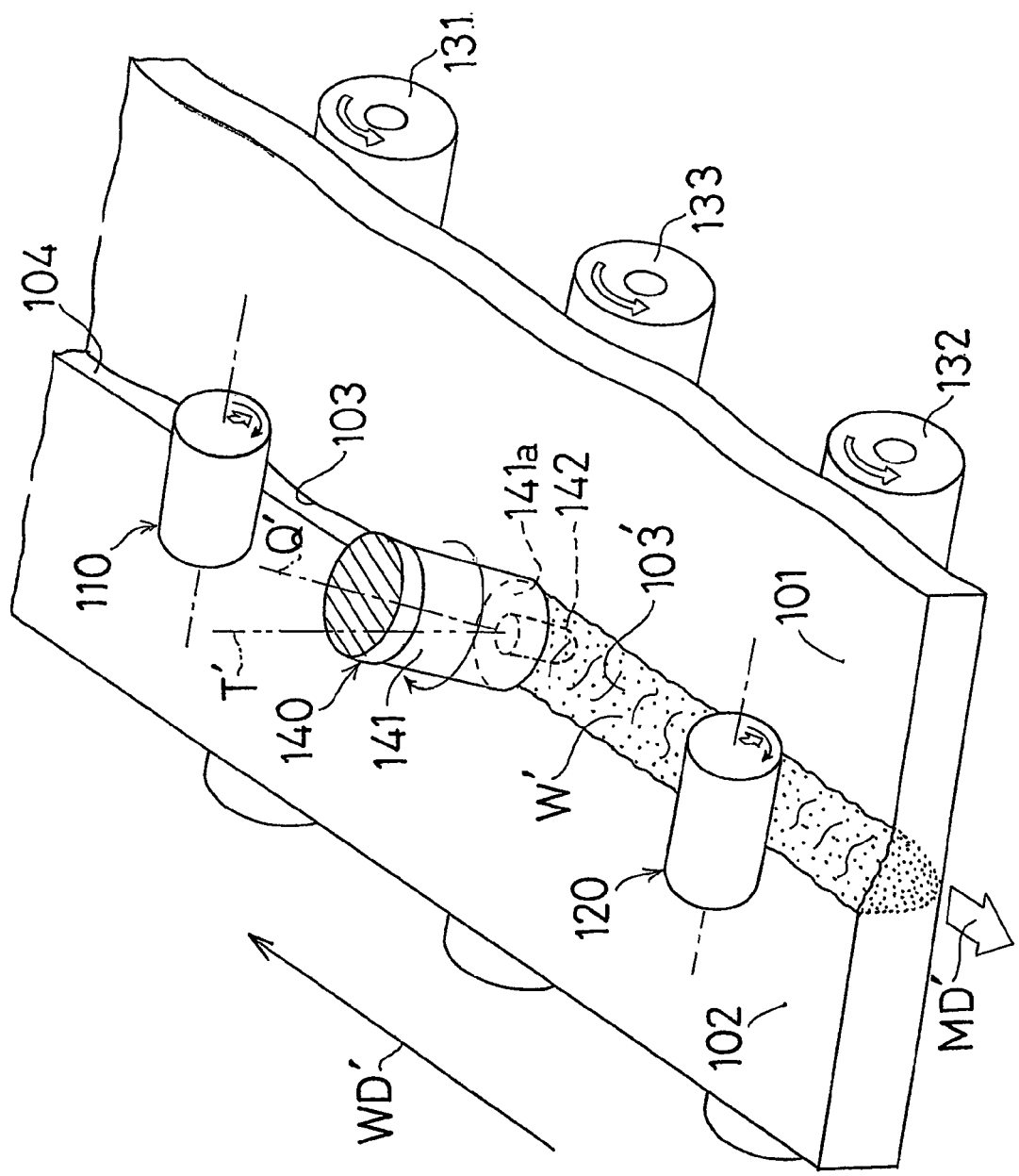
FIG. 29 is a perspective view showing the state in the middle of joining the butted portion of both the joining members by a conventional friction agitation joining method.
Figure 30:
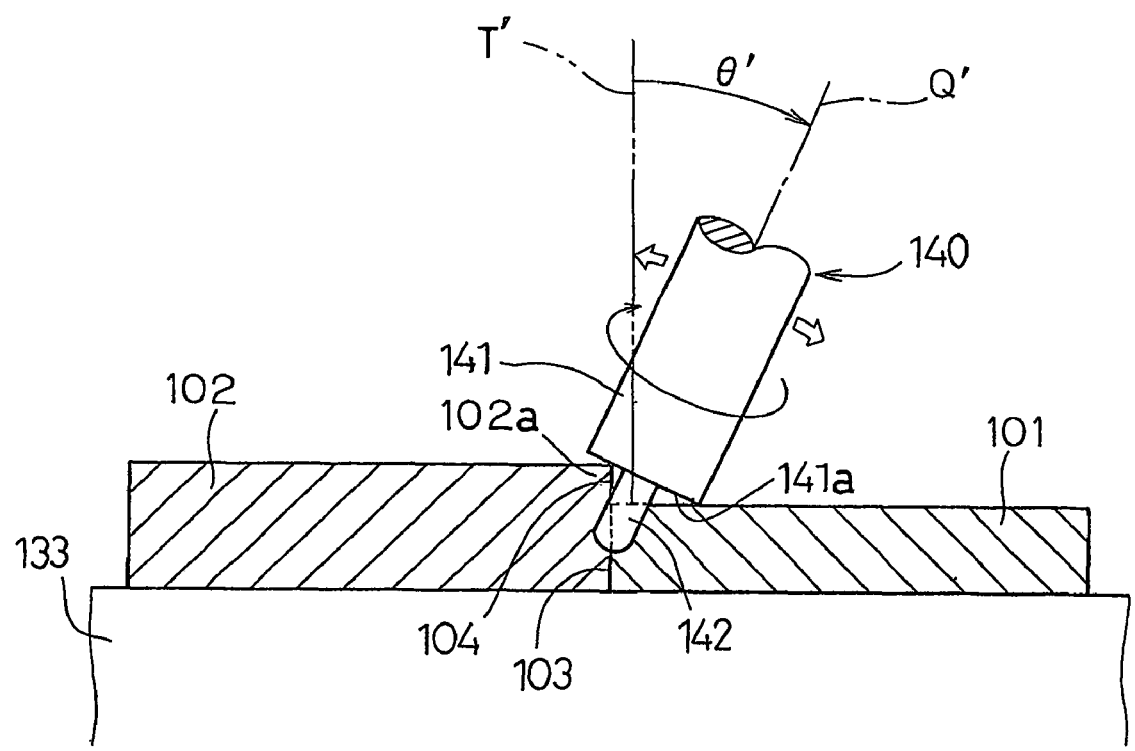
FIG. 30 is a cross-sectional view of both the joining members at the probe inserted position.

FIGS. 26 to 28 are drawings for explaining a friction agitation joining method, a method for manufacturing of butted joining members and a friction agitation joining method according to the sixth embodiment of the present invention. In these figures, the same reference numeral is allotted to the same component as in the aforementioned first embodiment. Hereinafter, this sixth embodiment will be explained by focusing on the differences between the third embodiment and the sixth embodiment.

In the sixth embodiment, the thickness t1 of the first joining member 1 is 3 mm or less, concretely, t1 is 1 mm, where the relation between the thickness t1 of the first joining member 1 and the thickness t2 of the second joining member 2 is given by the inequality: t2>t1 (see FIG. 28).

Figure 31:
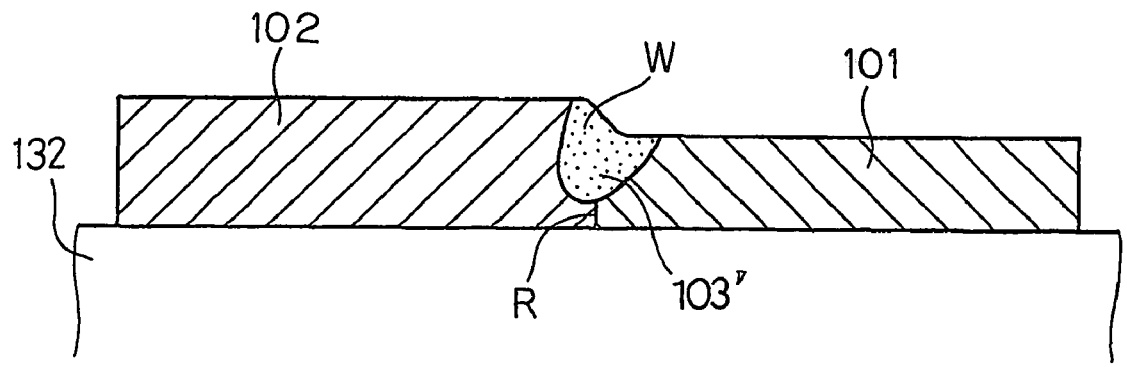
FIG. 31 is a cross-sectional view of the joining members in a joined state.

The friction agitation joining apparatus 80 is equipped with a friction agitation joining sub-joining tool 45 for joining the root remaining portion R (see FIG. 31). Hereinafter, the aforementioned joining tool 40 for joining the butted portion 3 of the joining members 1 and 2 from the upper surface side, the rotor 41 and the probe 42 will be referred to as a "main joining tool", a "main rotor" and a "main probe," respectively, for an explanation purpose.

The sub-joining tool 45 is provided with a column-shaped sub-rotor 46 having a larger diameter and a pin-shaped sub-probe 47 having a smaller diameter. The sub-probe 47 is integrally projected from the rotational center of the end face 46a of the sub-rotor 46 along the rotation-axis S.

The length of the sub-probe 47 is set to be much shorter than that of the main probe 42 of the main joining tool 40. It is especially preferable that the length falls within the range of from 0.1 mm to 0.5 mm. The other structure of this sub-joining tool 45 is the same as the aforementioned main joining tool 40.

This sub-joining tool 45 is disposed at the portion near the joining-direction forward side of the main probe inserted position of the lower surface side of the joining members 1 and 2 with the sub-probe 47 facing up. In this sixth embodiment, the rotating sub-probe 47 of the sub-joining tool 45 is inserted into the portion at the joining-direction forward side near the main probe inserted position from the lower surface side. Preferably, the end face 46 of the sub-rotor 46 is pressed against the lower surface of the joining members 1 and 2. Then, in this state, both joining members 1 and 2 are moved in a predetermined direction MD so that the main probe 42 and the sub-probe 47 advance the butted portion 3.

At this time, it is preferable that the insertion depth δ of the sub-probe 47 into the butted portion 3 from the lower surface (see FIG. 28) falls within the range of from 0.1 to 0.5 mm because of the following reasons. If the insertion depth δ of the sub-probe 47 is less than 0.1 mm, there is a possibility that an insertion depth may be insufficient and therefore the root remaining portion may remain. On the other hand, if the insertion depth δ of the sub-probe 47 exceeds 0.5 mm, the force to be required for moving the joining members 1 and 2 becomes large, which in turn becomes difficult to perform the moving operation of the joining members 1 and 2. Accordingly, it is preferable that the insertion depth δ of the sub-probe 47 falls within the range of from 0.1 to 0.5 mm.

In accordance with the movement of the joining members 1 and 2, the portion near the joining-direction forward side of the probe inserted position at the butted portion 3 of the joining members 1 and 2 is joined shallowly by the sub-joining tool 47 of the sub-probe 45. When, the joined portion reaches the main probe inserted position of the main joining tool 40, the butted portion 3 is joined in the entire thickness direction by the main probe 42. Accordingly, the generation of the root remaining portion R (see FIG. 31) can be prevented.

In the present invention, as shown by the hypothetical line in FIG. 27, the joining may be performed in a state in which the rotating sub-probe 47 of the sub-joining tool 45 may be inserted into the joined butted portion 3' of the joining members 1 and 2 from the lower surface side. In cases where there are no obstruction such as a backing roller 33 at the lower surface side of the butted portion 3 of the joining members 1 and 2 at the main probe inserted position, the joining may be performed while inserting a rotating sub-probe 47 of the sub-joining tool 45 into the lower surface of the main probed inserted position of the joining members 1 and 3 at the butted portion 3.

Furthermore, in the friction agitation joining method according to the present invention, the butted portion 3 may be joined by moving the rotating probe 42 inserted into the butted portion 3 of the joining members 1 and 2 along the butted portion 3 in a state in which the position of the joining members 1 and 2 is fixed. In this case, the moving direction of the probe coincides with the joining direction.

Next, concrete examples of the friction agitation joining method according to the third to sixth embodiments will be shown.

Example 5

Long plate-shaped first joining members made of aluminum alloy (Materials: JIS A6063-T5, Thickness: 1 mm) and long plate-shaped second t joining members made of aluminum alloy (Materials: JIS A6063- T5, Thickness: 2 mm) were prepared. Then, side edges of the joining members 1 and 2 were butted against each other with the lower surfaces being flush with each other, and the butted portion 3 thereof was joined along the entire length by the aforementioned joining method according to the third embodiment.

Example 6

The butted portion 3 of the joining members 1 and 2 was joined along the entire length by the aforementioned joining method according to the fourth embodiment. Other joining conditions are the same as those of the aforementioned fifth example.

Example 7

The butted portion 3 of the joining members 1 and 2 was joined along the entire length by the aforementioned joining method according to the fifth embodiment. Other joining conditions are the same as those of the aforementioned fifth example.

Example 8

The butted portion 3 of the joining members 1 and 2 was joined along the entire length by the aforementioned joining method according to the sixth embodiment. In this joining, the insertion depth δ of the sub-probe 47 of the sub-joining tool 45 was set as 0.1 mm. Other joining conditions are the same as those of the aforementioned fifth example.

About the butted joining members obtained in the above examples 5 to 8, each cross-section was observed by using a microscope, and the joining state was evaluated. As a result, no root remaining portion can be found in any butted joining member. This result shows that the joined butted joining members have high bonding strength and outstanding strength reliability.

Effects of the present invention will be summarized as follows.

According to friction-agitation-joining method of the first aspect of the present invention, by pressing joining-direction forward sides of the first joining member and the second joining member with respect to a probe inserted position from the upper surface sides by a first forward pressing roller and a second forward pressing roller, respectively, it is possible to prevent a fault such as an unexpected movement of each joining member during the joining and also to correct the configuration defect of each joining member such as torsion or curvature. Furthermore, performing the joining process in this state can prevent the generation of poor Junction such as joint defect or thermal distortion, resulting in high quality joined butted joining members.

According to the friction agitation joining method of the second aspect of the present invention, the same effects as in the first aspect of the present invention can be obtained.

According to the friction agitation joining method of the third aspect of the present invention, generation of poor junction can be prevented or suppressed, and therefore butted joining members with high quality can be obtained.

According to the friction agitation joining method of the fourth aspect of the present invention, since the butted portion is joined while heating the lower surface of the butted portion of the joining members at the probe inserted position or the joining-direction forward side, generating of the root remaining portion can be prevented, and therefore joined butted joining members with high joining strength can be obtained.

According to the friction agitation joining method of the fifth aspect of the present invention, since the butted portion is joined by moving the joining members with respect to the main probe and the sub-probe so that the probes advance along the butted portion in a state in which a rotating sub-probe of the sub-joining tool is inserted into the butted portion of the joining members or the joined butted portion, generation of root remaining portion can be prevented, and therefore butted joining members having high joining strength can be obtained.

According to the method for manufacturing butted joining members of the sixth aspect of the present invention, the same effects as in the first aspect of the present invention can be obtained.

According to the method for manufacturing butted joining members of the seventh aspect of the present invention, the same effects as in the second aspect of the present invention can be obtained.

According to the method for manufacturing butted joining members of the eighth aspect of the present invention, the same effects as in the third aspect of the present invention can be obtained.

According to the method for manufacturing butted joining members of the ninth aspect of the present invention, the same effects as in the fourth aspect of the present invention can be obtained.

According to the method for manufacturing butted joining members of the tenth aspect of the present invention, the same effects as in the fifth aspect of the present invention can be obtained.

According to the friction agitation joining apparatus of the eleventh aspect of the present invention, the friction agitation joining method of the first aspect of the present invention or the method for manufacturing butted joining members of the sixth aspect of the present invention can be performed efficiently.

According to the friction agitation joining apparatus of the twelfth aspect of the present invention, the friction agitation joining method of the second aspect of the present invention or the method for manufacturing butted joining members of the seventh aspect of the present invention can be performed efficiently.

According to the friction agitation joining apparatus of the thirteenth aspect of the present invention, the friction agitation joining method of the third aspect of the present invention or the method for manufacturing butted joining members of the eighth aspect of the present invention can be performed efficiently.

According to the friction agitation joining apparatus of the fourteenth aspect of the present invention, the friction agitation joining method of the fourth aspect of the present invention or the method for manufacturing butted joining members of the ninth aspect of the present invention can be performed efficiently.

According to the friction agitation joining apparatus of the fifteenth aspect of the present invention, the friction agitation joining method of the fifth aspect of the present invention or the method for manufacturing butted joining members of the tenth aspect of the present invention can be performed efficiently.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

INDUSTRIAL APPLICABILITY

A friction agitation joining method, a method for manufacturing joined butted members and a friction agitation joining apparatus are preferably used for manufacturing metal plate-shaped members used as, for example, flooring materials, wall materials and ceiling materials for transporting device such as automobiles, aircrafts and railroad vehicles.

The invention claimed is:

1. A friction agitation joining method for joining a first joining member and a second joining member butted against each other with a level difference formed at upper surface sides thereof by relatively moving said first and second joining members with respect to a rotating probe of a joining tool inserted into a butted portion of said first and second joining members from said upper surface sides so that said probe advances along said butted portion, the method comprising:

performing joining of said butted portion while pressing joining-direction forward sides of said first joining member and said second joining member with respect to a probe inserted position from said upper surface sides by a first forward pressing roller and a second forward pressing roller, respectively, wherein said joining of said butted portion is performed while pressing a joined butted portion of said first and second joining members from said upper surface sides by a third backward pressing roller with a tapered periphery.

2. The friction agitation joining method as recited in claim 1, wherein said periphery of said third backward pressing roller is cooled.

3. A friction agitation joining method for joining a first joining member and a second joining member butted against each other with a level difference formed at upper surface sides thereof by relatively moving said first and second joining members with respect to a rotating probe of a joining tool inserted into a butted portion of said first and second joining members from said upper surface sides so that said probe advances along said butted portion, the method comprising:

performing joining of said butted portion while pressing joining-direction forward sides of said first joining member and said second joining member with respect to a probe inserted position from said upper surface sides by a first forward pressing roller and a second forward pressing roller, respectively, wherein said first forward pressing roller and said second forward pressing roller are separate members, and wherein said joining of said butted portion is performed in a state in which an axis of at least one of rollers including said first forward pressing roller and said second forward pressing roller is inclined with respect to a butting direction of said joining members within a plane perpendicular to a joining direction.

4. A friction agitation joining method for joining a first joining member and a second joining member butted against each other with a level difference formed at upper surface sides thereof by relatively moving said first and second joining members with respect to a rotating probe of a joining tool inserted into a butted portion of said first and second joining members from said upper surface sides so that said probe advances along said butted portion, the method comprising:

performing joining of said butted portion while pressing joining-direction forward sides of said first joining member and said second joining member with respect to a probe inserted position from said upper surface sides by a first forward pressing roller and a second forward pressing roller, respectively, wherein said first forward pressing roller and said second forward pressing roller are separate members, and wherein said joining of said butted portion is performed while changing at least one of an inclination angle of an axis of said first forward pressing roller with respect to a butting direction of said first joining member within a plane perpendicular to a joining direction and an inclination angle of an axis of said second forward pressing roller with respect to said butting direction of said second joining member within a plane perpendicular to a joining direction based on a measured value of a characteristic concerning a joint state of a joined butted portion of said first and second joining members.

5. A friction agitation joining method for joining a first joining member and a second joining member butted against each other with a level difference formed at upper surface sides thereof by relatively moving said first and second joining members with respect to a rotating probe of a joining tool inserted into a butted portion of said first and second joining members from said upper surface sides so that said probe advances along said butted portion, the method comprising:

performing joining of said butted portion while pressing joining-direction forward sides of said first joining member and said second joining member with respect to a probe inserted position from said upper surface sides by a first forward pressing roller and a second forward pressing roller, respectively, wherein said first forward pressing roller and said second forward pressing roller are separate members, and wherein said joining of said butted portion is performed in a state in which an axis of at least one of rollers including said first forward pressing roller and said second forward pressing roller is inclined with respect to a butting direction of said joining members within a plane parallel to upper surfaces of said joining members so that force in a butting direction is given to said joining members.

* * * * *